(12) United States Patent
Ng et al.

(10) Patent No.: US 12,342,250 B2
(45) Date of Patent: Jun. 24, 2025

(54) METHOD AND APPARATUS FOR POSITIONING SYSTEM WITH MULTIPLE RADIO ACCESS TECHNOLOGIES

(71) Applicant: Samsung Electronics Co., Ltd., Suwon-si (KR)

(72) Inventors: Boon Loong Ng, Plano, TX (US); Jianzhong Zhang, Dallas, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 446 days.

(21) Appl. No.: 17/652,892

(22) Filed: Feb. 28, 2022

(65) Prior Publication Data

US 2022/0283321 A1 Sep. 8, 2022

Related U.S. Application Data

(60) Provisional application No. 63/155,593, filed on Mar. 2, 2021.

(51) Int. Cl.
| | |
|---|---|
| *H04W 64/00* | (2009.01) |
| *G01S 19/48* | (2010.01) |
| *H04W 4/33* | (2018.01) |
| *G01S 5/04* | (2006.01) |
| *G01S 19/46* | (2010.01) |

(52) U.S. Cl.
CPC ............. *H04W 4/33* (2018.02); *H04W 64/00* (2013.01); *G01S 5/04* (2013.01); *G01S 19/46* (2013.01); *G01S 19/48* (2013.01)

(58) Field of Classification Search
CPC ..................................................... H04W 64/00
USPC ........................................................ 455/456.1
See application file for complete search history.

(56) References Cited

U.S. PATENT DOCUMENTS

| | | |
|---|---|---|
| 8,085,200 B2 | 12/2011 | Powell et al. |
| 10,064,012 B1 | 8/2018 | Boston et al. |
| 10,094,910 B2 | 10/2018 | Hamilton |

(Continued)

FOREIGN PATENT DOCUMENTS

| | | | |
|---|---|---|---|
| CN | 105891867 A | | 8/2016 |
| CN | 106646353 A | * | 5/2017 |

(Continued)

OTHER PUBLICATIONS

International Search Report and Written Opinion issued Jun. 9, 2022 regarding International Application No. PCT/KR2022/002914, 7 pages.

(Continued)

*Primary Examiner* — Ahmad F. Matar
*Assistant Examiner* — Jirapon Tulop

(57) ABSTRACT

A system and method for an indoor position localization of a target device is provided. A network comprising a server and a plurality of anchors is configured to fuse two radio technologies to estimate a location of the target device within an indoor facility. The method includes obtaining, via a first radio technology, a first candidate location of a target device. The method also includes obtaining, via a second radio technology, a plurality of second candidate locations of the target device. The method further includes selecting one of the second candidate locations as an estimated position of the target device based on a proximity of each of the second candidate locations to the first candidate location.

20 Claims, 22 Drawing Sheets

(56) References Cited

U.S. PATENT DOCUMENTS

| | | | |
|---|---|---|---|
| 10,567,918 B2 | 2/2020 | Farnham | |
| 2011/0013569 A1* | 1/2011 | Scherzer | ............... H04W 48/20 707/769 |
| 2021/0092563 A1 | 3/2021 | Hollar et al. | |

FOREIGN PATENT DOCUMENTS

| | | |
|---|---|---|
| CN | 110793519 A | 2/2020 |
| CN | 111031472 A | 4/2020 |
| KR | 10-0819392 B1 | 4/2008 |
| WO | 2022046478 A2 | 3/2022 |

OTHER PUBLICATIONS

Extended European Search Report issued Feb. 27, 2024 regarding Application No. 22763571.1, 16 pages.
Seong et al., "High-Speed Positioning and Automatic Updating Technique Using Wi-Fi and UWB in a Ship", Wireless Personal Communications, vol. 94, No. 3, Jun. 2017, pp. 1105-1121.
Bargshady et al., "Hybrid WiFi/UWB, Cooperative Localization using Particle Filter", 2015 International Conference on Computing, Networking and Communications, Wireless Networks Symposium, Feb. 2015, pp. 1055-1060.

* cited by examiner

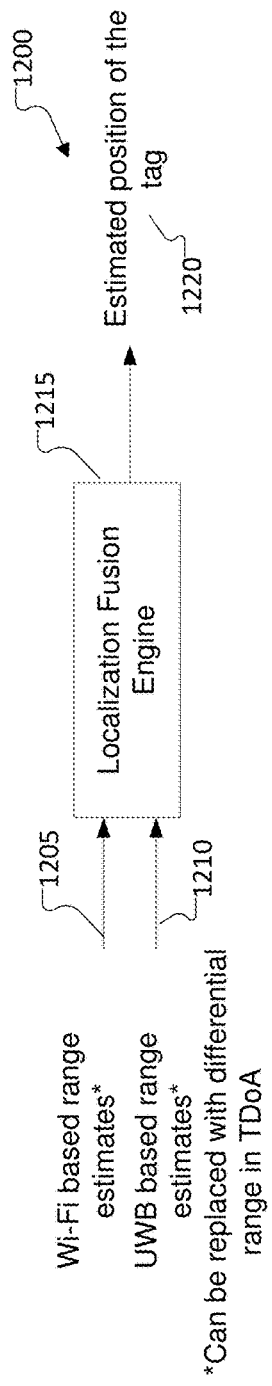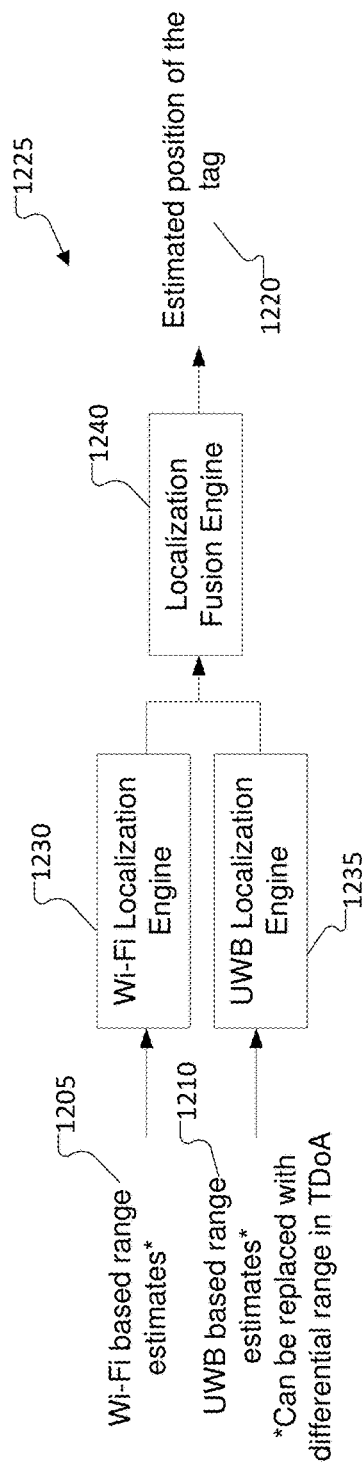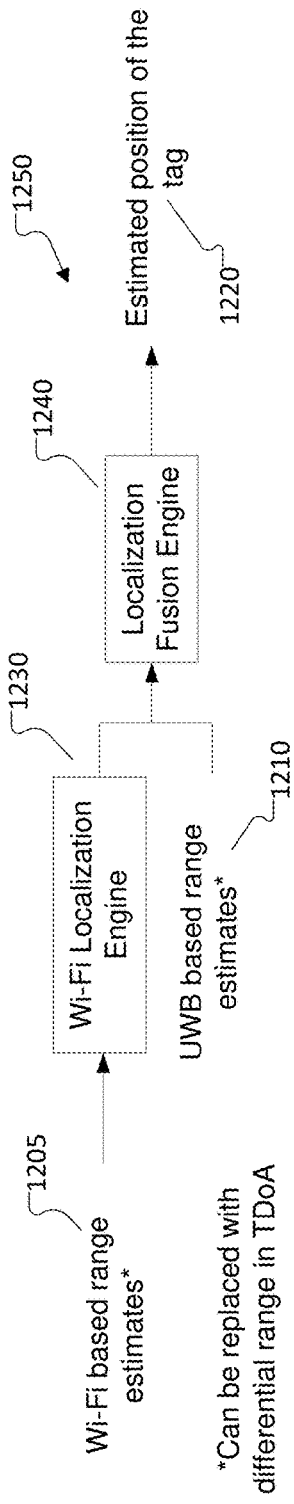
FIG. 12A
FIG. 12B
FIG. 12C

METHOD AND APPARATUS FOR POSITIONING SYSTEM WITH MULTIPLE RADIO ACCESS TECHNOLOGIES

CROSS-REFERENCE TO RELATED APPLICATIONS AND CLAIM OF PRIORITY

The present application claims priority to U.S. Provisional Patent Application No. 63/155,593, filed on Mar. 2, 2021. The contents of the above-identified patent document are incorporated herein by reference.

TECHNICAL FIELD

The present disclosure relates generally to wireless communication systems and, more specifically, the present disclosure relates to a system and method for location positioning using different radio access technologies.

BACKGROUND

Mobile wireless communication devices are ubiquitous in society. With the evolution of the mobile communication devices, geographic location positioning is increasing in demand. For example, wireless technology can be used for localization of a mobile device. An example of an outdoor localization technology is the Global Positioning System (GPS). GPS may not be accurate for indoor areas.

SUMMARY

The present disclosure relates to wireless communication systems and, more specifically, the present disclosure relates to a system and method for location positioning using different radio access technologies.

In one embodiment, an apparatus is provided. The apparatus includes a transceiver and a processor. The processor is configured to obtain, via a first radio technology, a first candidate location of a target device. The processor also is configured to obtain, via a second radio technology, a plurality of second candidate locations of the target device. The processor is further configured to select one of the second candidate locations as an estimated position of the target device based on a proximity of each of the second candidate locations to the first candidate location.

In another embodiment, a method is provided. The method includes obtaining, via a first radio technology, a first candidate location of a target device. The method also includes obtaining, via a second radio technology, a plurality of second candidate locations of the target device. The method further includes selecting one of the second candidate locations as an estimated position of the target device based on a proximity of each of the second candidate locations to the first candidate location.

In yet another embodiment, a non-transitory computer readable medium is provided. The non-transitory computer readable medium a plurality of instructions that, when executed by at least one processor, cause the at least one processor to obtain, via a first radio technology, a first candidate location of a target device; obtain, via a second radio technology, a plurality of second candidate locations of the target device; and select one of the second candidate locations as an estimated position of the target device based on a proximity of each of the second candidate locations to the first candidate location.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 12A-12C illustrate example localization frameworks jointly processing the Wi-Fi and UWB based range estimates according to embodiments of the present disclosure;

DETAILED DESCRIPTION

Figure 1:
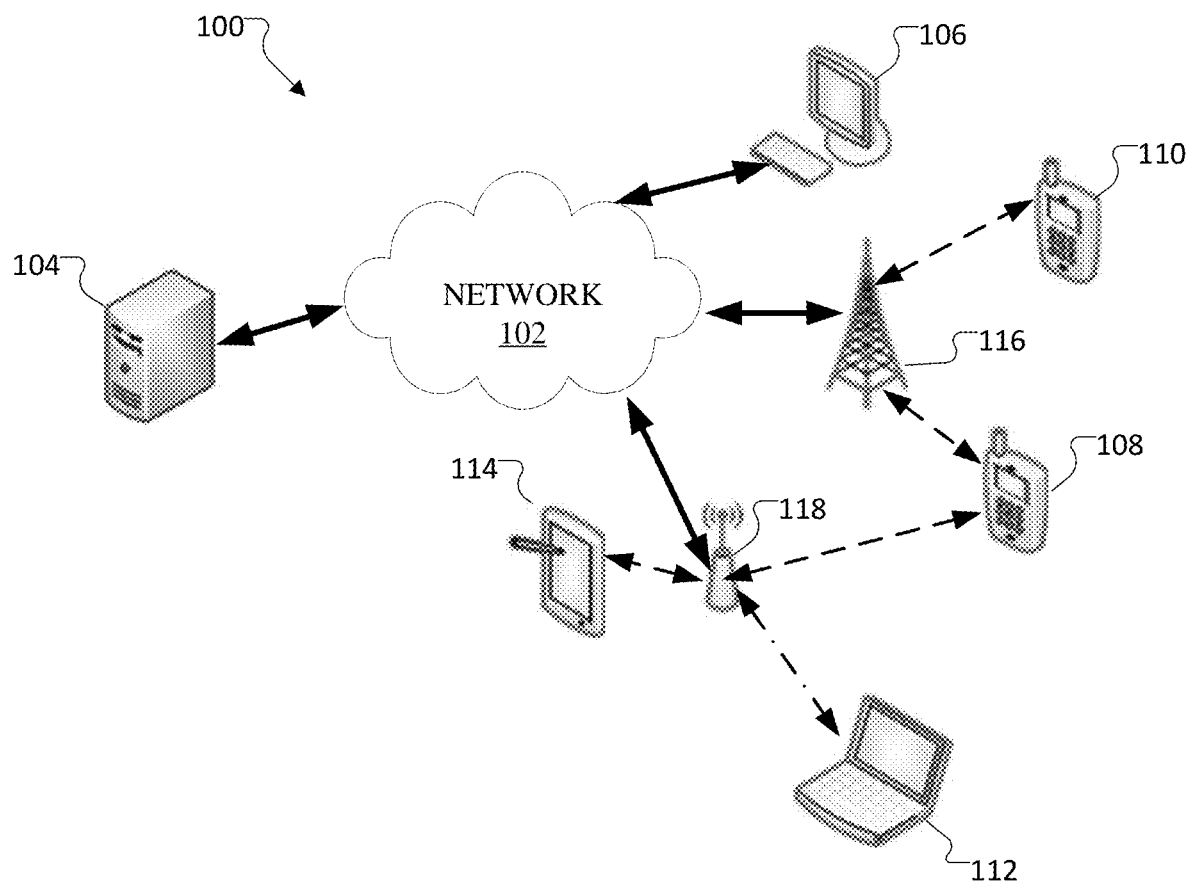
FIG. 1 illustrates an example wireless network according to embodiments of the present disclosure.

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In current solutions, the localization of the tag or target based on range measurements from anchors can be implemented in a Wi-Fi positioning system, using the Wi-Fi round trip time (RTT) standards such as IEEE 802.11mc or IEEE 802.11az. Due to the limited measurement bandwidth, the localization/positioning accuracy (or resolution) with Wi-Fi is typically >1 m, such as 5-15 m). Other methods of Wi-Fi positioning are also possible, such as signal strength based and fingerprinting based, although they are typically less accurate than the RTT (time of flight) based method. In a signal strength-based procedure, the range estimate can be derived from the received signal strength and a signal path-loss model, which is a function of the radio propagation distance between the transmitter and the receiver. The fingerprinting-based approach assumes the received signal strength or profile.

Therefore, the localization accuracy is poor in current solutions that use only Wi-Fi to estimate and/or track the position of a tag. This in turn can lead to a false indication of the position of a tag.

Embodiments of the present disclosure provide a localization solution that utilizes the Wi-Fi and UWB measurements jointly to obtain a more accurate position. The solution fuses Wi-Fi measurements with UWB measurements by using the Wi-Fi localization result as a coarse estimate of the location, and is then refining the Wi-Fi measurements using UWB measurements. In this disclosure, positioning and localization are used inter-changeably. Embodiments of the present disclosure are especially useful for situations in which there is insufficient UWB measurement available (e.g., because of a low UWB anchors' density, or shorter maximum range for UWB signal compared to that of Wi-Fi). In such situations, joint Wi-Fi and UWB measurements can be used to generate a localization with UWB-like localization accuracy.

Certain embodiments can be applied to combine two or more radio technologies with different achievable ranging/positioning accuracies, as determined by the respective physical layer parameter configurations such the system bandwidth, the transmit power, the frequency band (which affects the path loss) and so on. For example, they can be applied to Wi-Fi (e.g., 40 MHz) and 5G NR (e.g. with 100 MHz). In another example, they can be applied to two different releases of Wi-Fi technologies, e.g., 802.11mc with 80 MHz and 802.11az with 160 MHz. Therefore, the UWB is only used as the representative technology with the higher achievable accuracy in the embodiments. Certain embodiments of the present disclosure provide the advantages of achieving sub-meter localization accuracy (<1 m) with this solution. This provides greater localization accuracy than current solutions that use only Wi-Fi localization. Certain embodiments achieve UWB-like localization accuracy (<1 m) without the need for high UWB anchors' density (high cost), or when there is insufficient UWB measurement available.

Certain embodiments can be applied to combine two or more radio technologies with different achievable ranging/ positioning accuracies, as determined by the respective physical layer parameter configurations such the system bandwidth, the transmit power, the frequency band (which affects the path loss) and so on. For example, they can be applied to Wi-Fi (e.g., 40 MHz) and 5G NR (e.g., with 100 MHz). In another example, they can be applied to two different releases of Wi-Fi technologies, e.g., 802.11mc with 80 MHz and 802.11az with 160 MHz. Therefore, the UWB is only used as the representative technology with the higher achievable accuracy in the embodiments.

When one of the radio technologies is UWB, certain embodiments are especially useful for situations in which there is insufficient UWB measurement available (e.g., because of a low UWB anchors' density). In such situations, joint Wi-Fi and UWB measurements can be used to generate a localization with UWB-like localization accuracy. Accurate positioning (e.g., <1 m @90% CDF) can enable location-based services, such as high accuracy indoor navigation, device location determination, safety and monitoring in enterprise, location-enabled troubleshooting, and the like.

Figure 2:
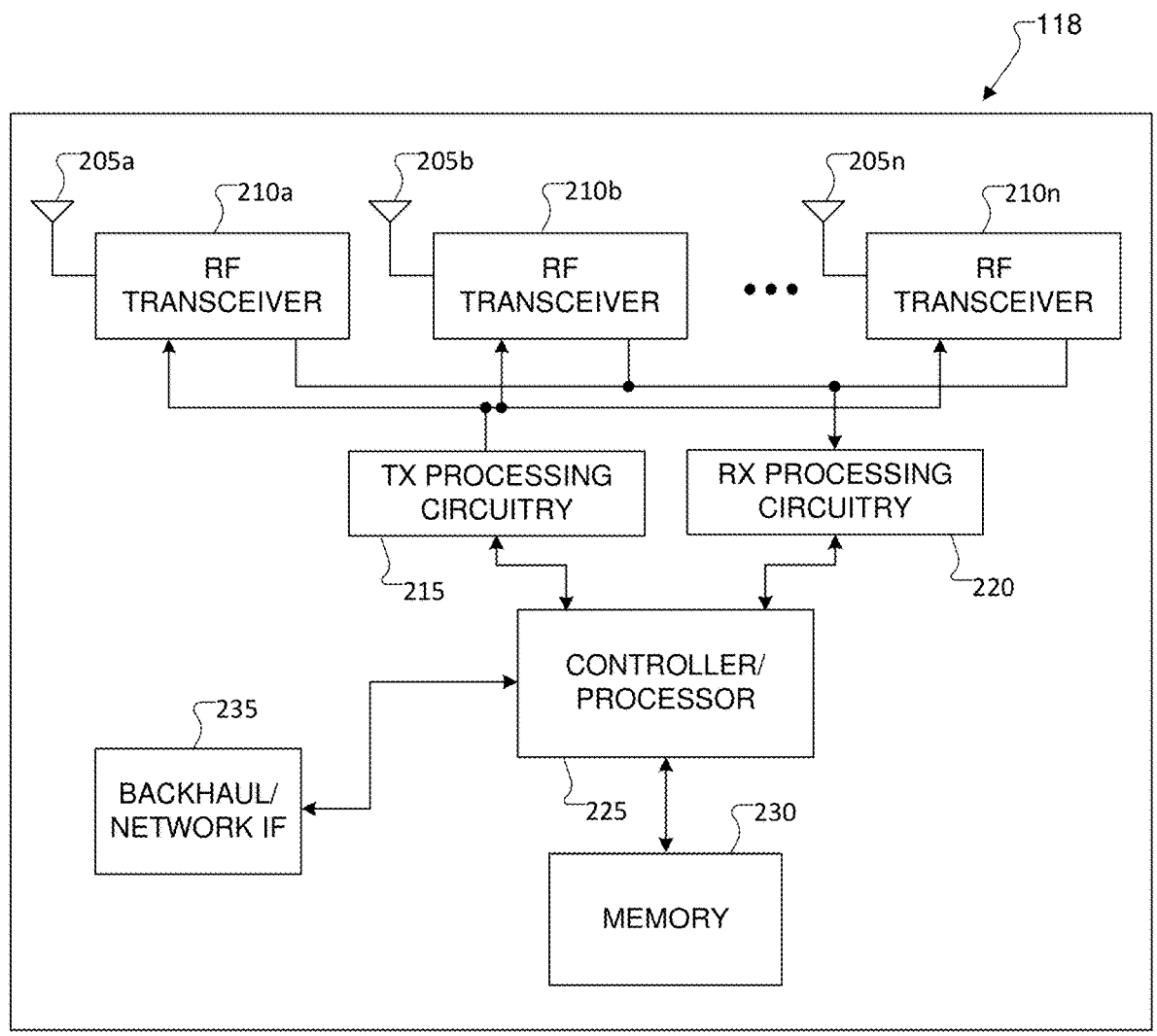
FIG. 2 illustrates an example access point (AP) according to embodiments of the present disclosure.
Figure 3:
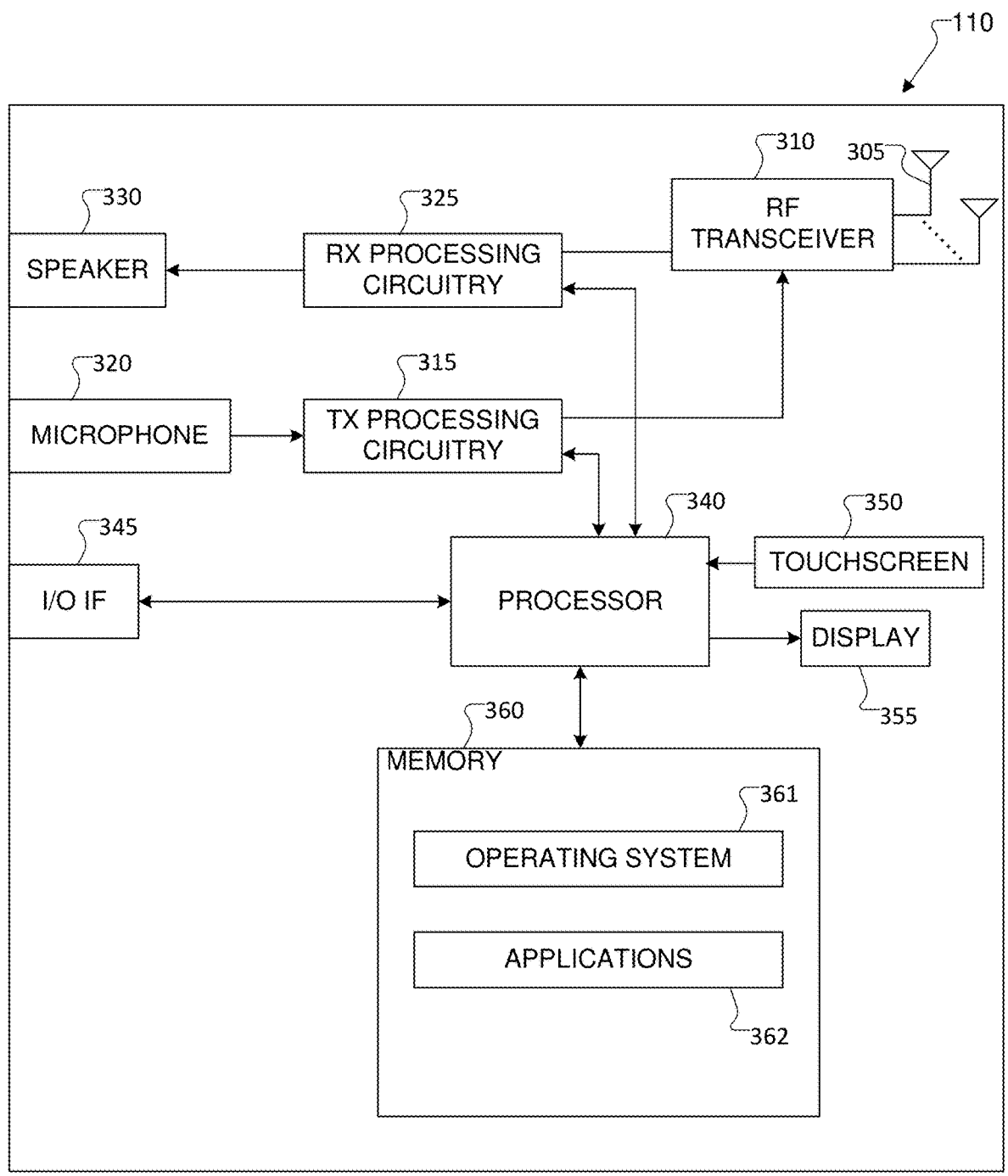
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various user equipments (UEs) 106-114. The UEs 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the UEs 106-114. Each server 104 could, for example, include one or more processing devices, one or more memories storing instructions and data, and one or more network interfaces facilitating communication over the network 102.

Each of the UEs 106-114 represent any suitable computing or processing device that interacts with at least one server (such as the server 104) or other computing device(s) over the network 102. The UEs 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver.

In this example, some UEs 108 and 110-114 communicate indirectly with the network 102. For example, the UEs 108 and PDA 110 communicate via one or more base stations 116, such as cellular base stations or eNodeBs (eNBs) or gNodeBs (gNBs). Additionally, mobile device 108 can communicate via one or more wireless access points 118. Also, the laptop computer 112 and the tablet computer 114 communicate via one or more wireless APs 118, such as IEEE 802.11 wireless access points. Note that these are for illustration only and that each of the UEs 106-114 could communicate directly with the network 102 or indirectly with the network 102 via any suitable intermediate device(s) or network(s). In certain embodiments, any of the UEs 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

FIG. 2 illustrates an example AP 118 according to embodiments of the present disclosure. The embodiment of the AP 118 illustrated in FIG. 2 is for illustration only. However, APs come in a wide variety of configurations, and FIG. 2 does not limit the scope of this disclosure to any particular implementation of an AP As shown in FIG. 2, the AP 118 includes multiple antennas 205a-205n, one or more RF transceivers 210a-210n, TX processing circuitry 215, and RX processing circuitry 220. The AP 118 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. In certain embodiments, the UE 118 includes one or both of a WiFi receiver or a UWB receiver.

The controller/processor 225 can include one or more processors or other processing devices that control the overall operation of the AP 118. For example, the controller/processor 225 could control the reception of uplink signals and the transmission of downlink signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the AP 118 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the AP 118 to communicate with other devices or systems over a backhaul connection or over a network. The interface 235 could support communications over any suitable wired or wireless connection(s). For example, when the AP 118 is implemented as an access point, the interface 235 could allow the AP 118 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of AP 118, various changes may be made to FIG. 2. For example, the AP 118 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the AP 118 could include multiple instances of each (such as one per RF transceiver). Also, various components in FIG. 2 could be combined, further subdivided, or omitted and additional components could be added according to particular needs.

FIG. 3 illustrates an example UE 118 according to embodiments of the present disclosure. The embodiment of the UE 118 illustrated in FIG. 3 is for illustration only, and the UEs 106-114 of FIG. 1 could have the same or similar configuration. However, UEs come in a wide variety of configurations, and FIG. 3 does not limit the scope of this disclosure to any particular implementation of a UE.

As shown in FIG. 3, the UE 118 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data). In certain embodiments, the UE 118 includes one or both of a WiFi receiver or a UWB receiver.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. In certain embodiments, the UE 118 includes one or both of a WiFi transmitter (transceiver) or a UWB transmitter (transceiver).

The processor 340 can include one or more processors or other processing devices and execute the OS 361 stored in the memory 360 in order to control the overall operation of the UE 116. For example, the processor 340 could control the reception of uplink signals and the transmission of downlink signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 6G systems and frequency bands associated therewith is for reference as certain embodiments of the present disclosure may be implemented in 6G systems. However, the present disclosure is not limited to 6G systems, or the frequency bands associated therewith, and embodiments of the present disclosure may be utilized in connection with any frequency band.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
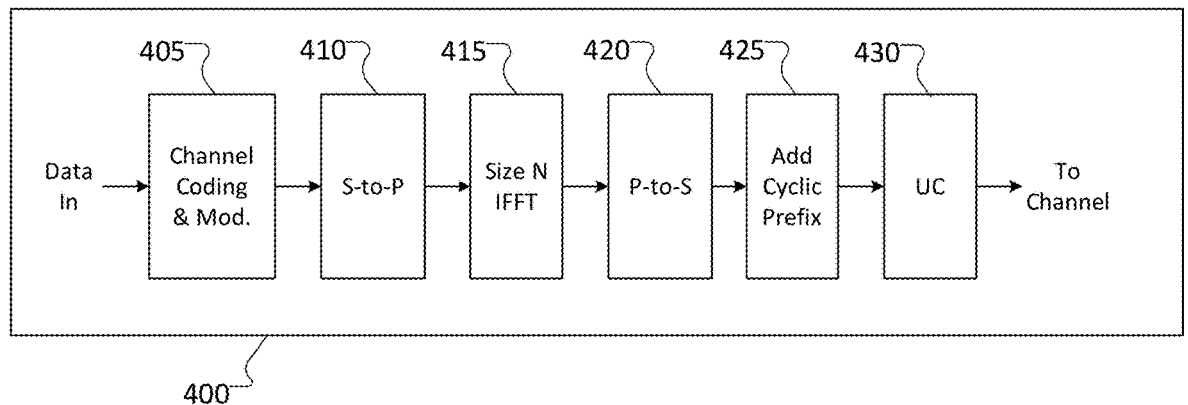
FIGS. 4 and 5 illustrate example wireless transmit and receive paths according to this disclosure.
Figure 5:
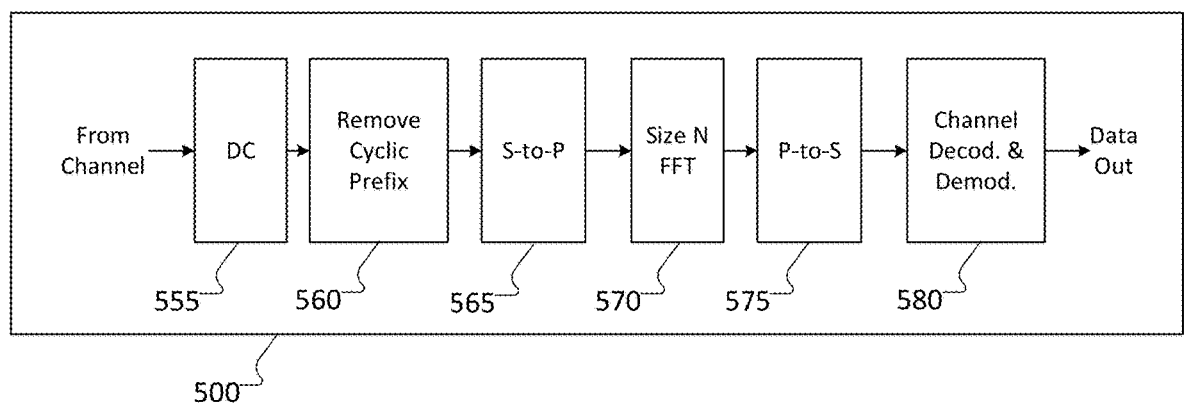

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support adapting a channel sensing threshold as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

Wireless technology can be used for localization of a mobile device. As indicated herein above, an example of an outdoor localization technology is GPS. Examples of wireless technologies that can be used in indoor localization include Wi-Fi, such as a Wi-Fi based positioning system (WPS), BLUETOOTH, and UWB technologies.

Figure 6:
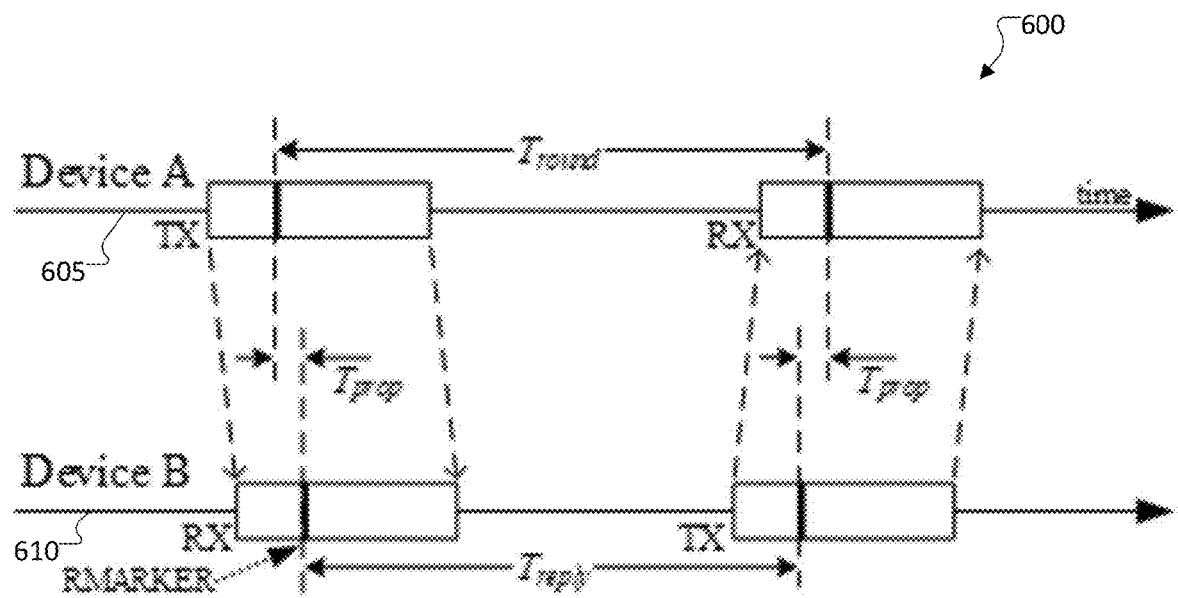
FIG. 6 illustrates single-sided two-way ranging according to embodiments of the present disclosure.

FIG. 6 illustrates single-sided two-way ranging according to embodiments of the present disclosure. The embodiments of the single-sided two-way ranging (SS-TWR) 600 shown in FIG. 6 is for illustration only. Other embodiments could be used without departing from the scope of the disclosure. The example shown in FIG. 6 and supporting text refer to the IEEE 802.15.4 standard document to respectively illustrate the Single-Sided TWR (SS-TWR) and Double-Sided TWR (DS-TWR) procedures.

One localization technique is the trilateration technique, which is method of determining the location of a device (referenced as a "tag") in space, using the ranges (distances) measurements between the tag and multiple spatially separated anchors with known locations. The ranges between the tag and the anchors can be determined using two-way ranging (TWR) between the tag and each of the anchors. The ranges are then combined in a way to produce an estimated location of the tag.

The SS-TWR 600 involves a simple measurement of the round trip delay of a single message from the initiator to the responder and a response sent back to the initiator. In the example operation of SS-TWR 600, device A 605 initiates the exchange and device B 610 responds to complete the exchange. Each device precisely timestamps the transmission and reception times of the message frames, and, as such, can calculate times $T_{round}$ and $T_{reply}$ by simple subtraction. The resultant time-of-flight, $T_{prop}$, can be estimated by the equation:

$$\hat{T}_{prop} = \frac{1}{2}(T_{round} - T_{reply}) \quad (1)$$

Figure 7:
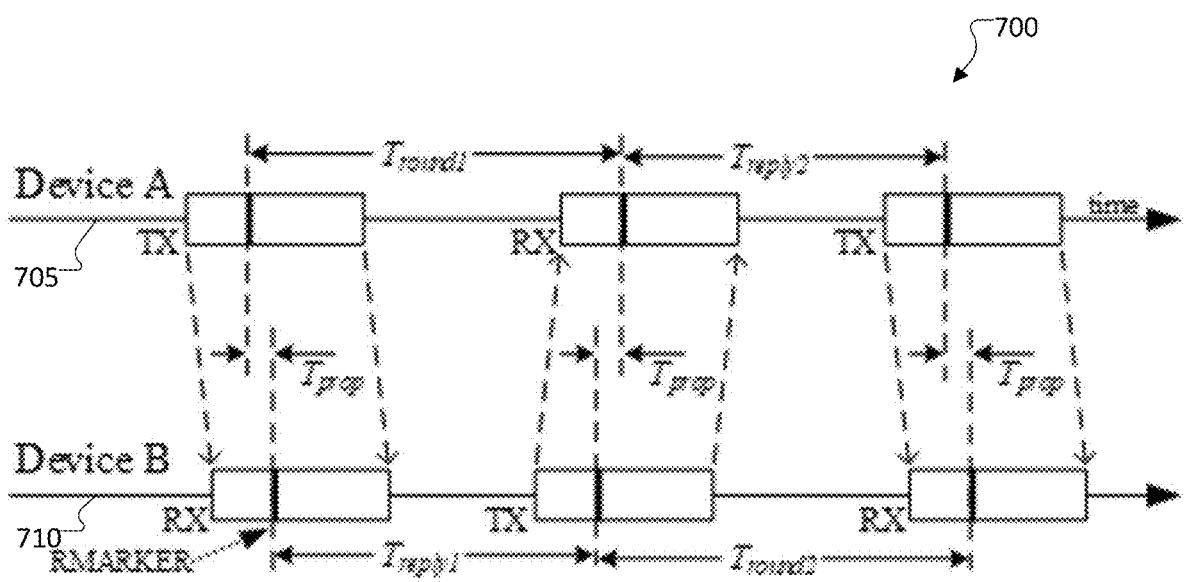
FIG. 7 illustrates double-sided two-way ranging according to embodiments of the present disclosure.

FIG. 7 illustrates double-sided two-way ranging according to embodiments of the present disclosure. The embodiments of the DS-TWR 700 shown in FIG. 6 is for illustration only. Other embodiments could be used without departing from the scope of the disclosure.

In the example shown in FIG. 7, the DS-TWR 700 includes three messages, which reduces the estimation error induced by clock drift from long response delays. Device A 705 is the initiator to initialize the first round-trip measurement, while device B 710 as the responder, responds to complete the first round-trip measurement, and meanwhile initializes the second round-trip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})} \quad (2)$$

The resultant time-of-flight estimate from SS-TWR 600 or DS-TWR 700 can then be converted to range estimate, R, using:

$$R = \hat{T}_{prop} \times c \quad (3)$$

where c is the speed of light. Procedures that enable range estimation via round trip time estimation also exist in other radio technologies such as Wi-Fi based on IEEE 802.11mc and IEEE 802.11az standards.

Besides two-way ranging, another common method for localization is based on time difference of arrival (TDOA) of one or more signal sources at one or more receivers. If the anchors are the signal sources, and the receiver is the target device to be located, then it is called downlink (DL) TDOA. If the target device to be located is the signal source and the anchors are the receivers, then it is called uplink (UL) TDOA.

Localization accuracy may be poor in current solutions that use only Wi-Fi to estimate or track the position of a tag. This in turn can lead to a false indication of the position of a tag. More accurate localization solutions are needed.

Figure 8:
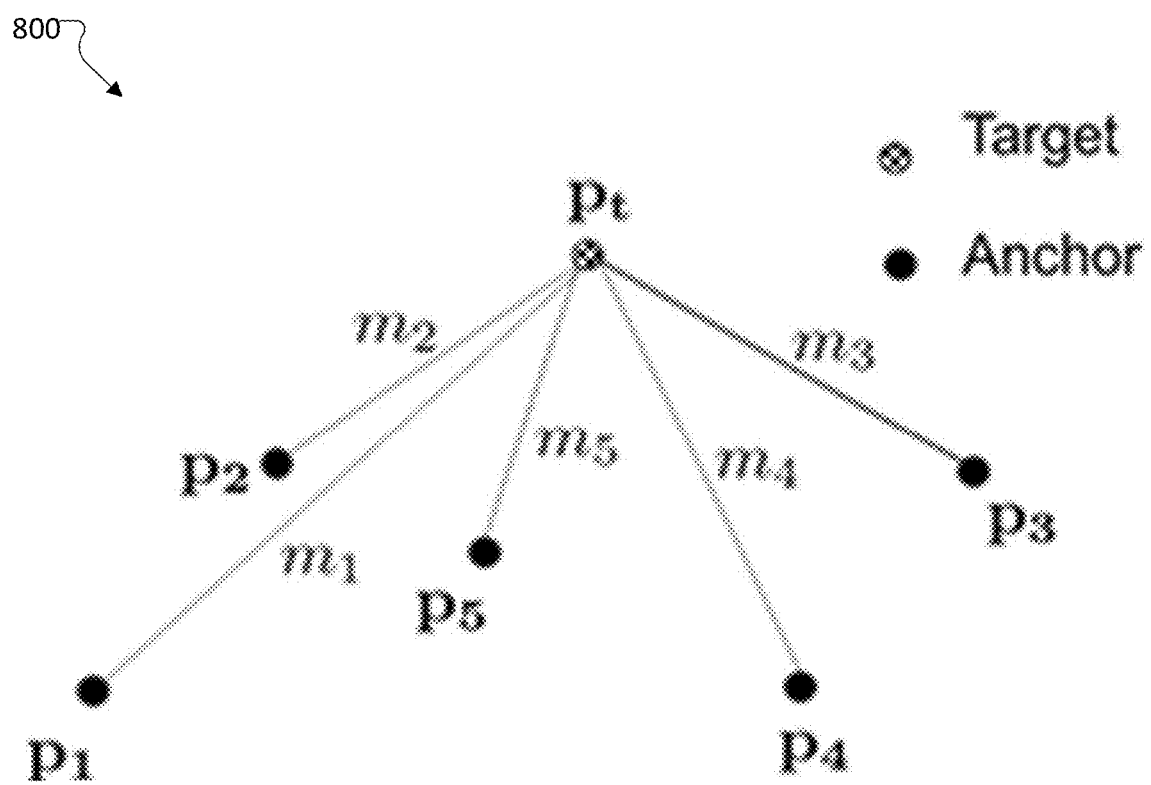
FIG. 8 illustrates localization of a tag based on range measurements from one or more anchors according to embodiments of the present disclosure.

FIG. 8 illustrates localization of a tag based on range measurements from one or more anchors according to embodiments of the present disclosure. The embodiment of the tag based on range measurements 800 shown in FIG. 8 is for illustration only. Other embodiments could be used without departing from the scope of the present disclosure.

In the example shown in FIG. 8, an anchors' coordinates are assumed to be known, with $i^{th}$ anchor at $p_i=(x_i, y_i, z_i)$, for i=1, 2, . . . , N, where N is the number of anchors. The tag (or target) location $p_t=(x_t, y_t, z_t)$ is to be estimated. For 2D localization problem, two out of three coordinates, such as just $(x_t, y_t)$, are estimated. The $i^{th}$ anchor performs a measurement $m_i$ on the tag, where m's can be range measurements. Localization schemes typically attempt to perform the inverse mapping from the measurements to the location of the target.

Figure 9A:
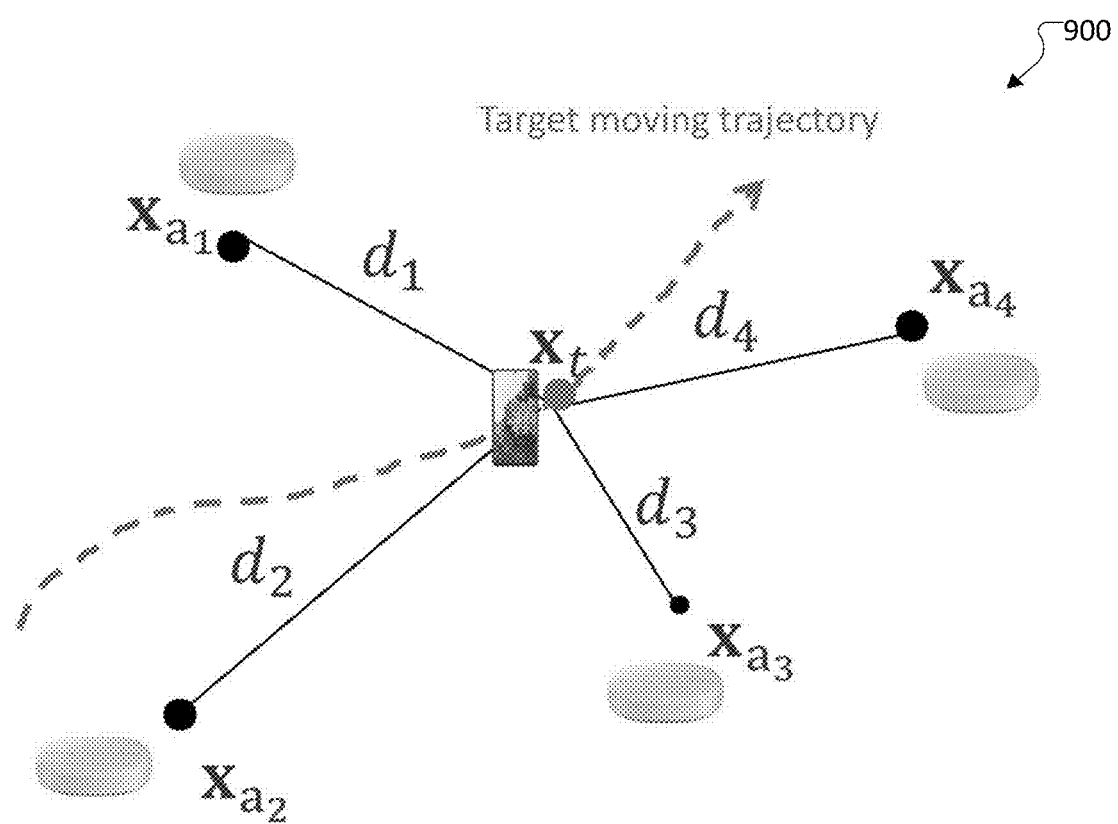
FIG. 9A illustrates an example localization and tracking process of a moving target according to embodiments of the present disclosure.
Figure 9B:
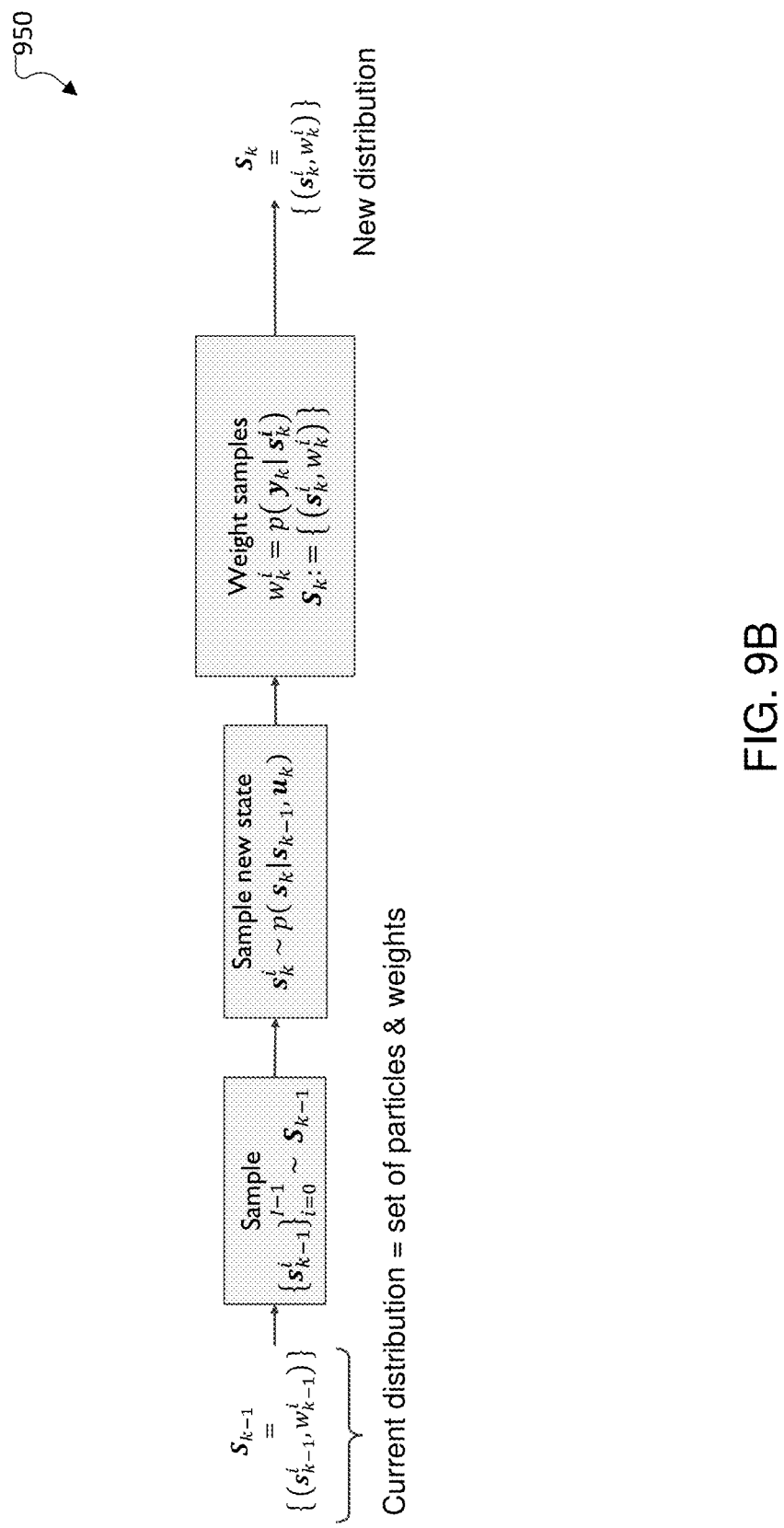
FIG. 9B illustrates an example of using particle filter to perform the localization process according to embodiments of the present disclosure.
Figure 9C:
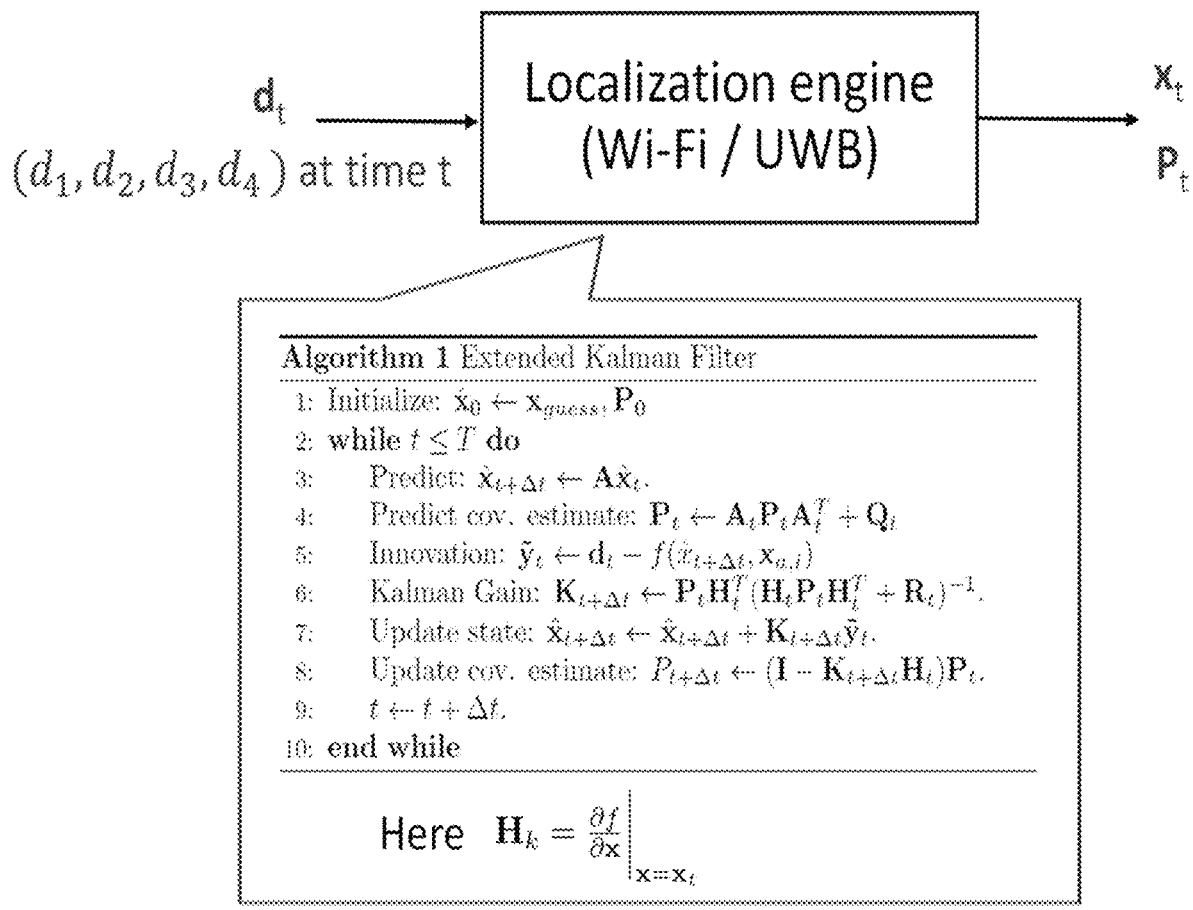
FIG. 9C illustrates an example Extended Kalman filter (EKF) localization process according to embodiments of the present disclosure.

FIG. 9A illustrates an example localization and tracking process of a moving target according to embodiments of the present disclosure. FIG. 9B illustrates an example of using particle filter to perform the localization process according to embodiments of the present disclosure. FIG. 9C illustrates an example Extended Kalman filter (EKF) localization process according to embodiments of the present disclosure. The illustrations of the localization 900 shown in FIGS. 9A-9C are for illustration only.

The EKF can be used to estimate and track the position of a tag based on the range measurements from the tag to multiple anchors. An EKF algorithm assumes a dynamic model for the tag. The dynamic model provides prediction to the trajectory of the tag according to the model, and the algorithm uses measurements to correct the prediction and generate a location estimate of the tag. Depending on the environment, the position of the tag relative to the anchors, and the actual trajectory of the tag, and others, one EKF model may produce a better localization and tracking result compared to another EKF model. The EKF assumes the probability density distribution of the tag's position to be estimated is Gaussian. Other Bayesian filtering approaches that do not necessarily make such assumption are also possible, for example, particle filter which works with general probability density distribution can be applied as well. The EKF-based localization engine and the particle filter-based localization are described in greater detail below. In both cases, the localization engine attempts to estimate the target's position (e.g., as it moves along a trajectory), as illustrated in the scenario below.

The EKF state $x_t$ can modeled as:

$$x_k = \begin{bmatrix} x \\ y \\ z \\ \dot{x} \\ \dot{y} \\ \dot{z} \end{bmatrix}_t \quad (4)$$

where x, y, z are the positions in 3 dimensions and $v_x=\dot{x}$, $v_y=\dot{y}$, $v_z=\dot{z}$ are the rate of change of positions in the respective 3 dimensions. The observations for the EKF are the erroneous range measurements denoted by the vector, $\tilde{d}_t=d_k+v_t$, where $d_t$ is the true range and $v_t$ is the measurement error vector. Other models for EKF including but not limited to the state modeled as $$x_k = \begin{bmatrix} x \\ y \\ z \end{bmatrix}_t,$$

positions and the velocity modeled by process noise are also possible. Other dynamics that model localization and tracking using range measurements are not precluded.

Herein below, the value R denotes the measurement error covariance matrix. Typically, it is a diagonal matrix (unless errors between two sensors are correlated). The value A represents the state transition model of the Extended Kalman filter for 3D or 2D localization, P is the prediction error covariance matrix, Q is the process noise covariance, H is the Jacobian matrix, $x_{a_j}$ is the 3D vector of anchor j location, and K is known as the Kalman Gain. The EKF can be implemented as follows:

Prediction:

$$\hat{x}_t = Ax_{t-1} + w_{t-1} \quad (5)$$

$$P_t = AP_{t-1}A^T + Q \quad (6)$$

Update:

$$y_t = \tilde{d}_t - f(\hat{x}_t, x_a) \quad (7)$$

$$\overline{R}_t = \beta^T R_t \quad (8)$$

$$S_t = H_t P_t H_t^T + R_t \quad (9)$$

$$K_t = P_t H_t^T S_t^{-1} \quad (10)$$

$$\hat{x}_t^+ = \hat{x}_t + K_t y_t \quad (11)$$

$$P_t^+ = (I - K_t H_t) P_t \quad (12)$$

The Jacobian is computed as:

$$H_t(j, i) = \frac{\partial f(\hat{x}_t^+, x_{a_j})}{\partial x_i} \quad (13)$$

The function relating the range measurement and the anchor location for $j^{th}$ anchor is given by $d_j = \sqrt{(x-x_j)^2 + (y-y_j)^2 + (z-z_j)^2}$ represented as the function, $f(\hat{x}_t^+, x_{a_j}) = d_j$. The Jacobian is computed using the following equations:

$$\frac{\partial f(\hat{x}_t^+, x_{a_j})}{\partial x} = \frac{x - x_j}{d_j} \quad (14)$$

$$\frac{\partial f(\hat{x}_t^+, x_{a_j})}{\partial y} = \frac{y - y_j}{d_j} \quad (15)$$

$$\frac{\partial f(\hat{x}_t^+, x_{a_j})}{\partial z} = \frac{z - z_j}{d_j} \quad (16)$$

In a particle filter, each particle $S_k$ represents a candidate position estimate and its weight (i.e., how likely the target is at the estimated position). A recursive process is applied to update each particle according to a motion model (with possible control input $u_k$), which is then weighted ($w_k$) based on the range measurements (observation, $y_k$). Resampling of the particles based on the new weights is then done to refocus the particles to most probable areas. An example of a particle filter localization 950 is shown in FIG. 9B.

In current solutions, the localization of the tag or target based on range measurements from anchors can be implemented in a Wi-Fi positioning system, using the Wi-Fi round trip time (RTT) standards such as IEEE 802.11mc or IEEE 802.11az. Due to the limited measurement bandwidth, the localization/positioning accuracy (or resolution) with Wi-Fi is typically >1 m, such as 5-15 m). Other methods of Wi-Fi positioning are also possible, such as signal strength based and fingerprinting based, although they are typically less accurate than the RTT (time of flight) based method. In a signal strength-based procedure, the range estimate can be derived from the received signal strength and a signal path-loss model, which is a function of the radio propagation distance between the transmitter and the receiver. The fingerprinting-based approach assumes the received signal strength or profile.

Therefore, the localization accuracy is poor in current solutions that use only Wi-Fi to estimate and/or track the position of a tag. This in turn can lead to a false indication of the position of a tag.

Embodiments of the present disclosure provide a localization solution that utilizes the Wi-Fi and UWB measurements jointly to obtain a more accurate position. The solution fuses Wi-Fi measurements with UWB measurements by using the Wi-Fi localization result as a coarse estimate of the location, and is then refining the Wi-Fi measurements using UWB measurements. In this disclosure, positioning and localization are used inter-changeably. Embodiments of the present disclosure are especially useful for situations in which there is insufficient UWB measurement available (e.g., because of a low UWB anchors' density, or shorter maximum range for UWB signal compared to that of Wi-Fi). In such situations, joint Wi-Fi and UWB measurements can be used to generate a localization with UWB-like localization accuracy.

Certain embodiments can be applied to combine two or more radio technologies with different achievable ranging/positioning accuracies, as determined by the respective physical layer parameter configurations such the system bandwidth, the transmit power, the frequency band (which affects the path loss) and so on. For example, they can be applied to Wi-Fi (e.g., 40 MHz) and 5G NR (e.g., with 100 MHz). In another example, they can be applied to two different releases of Wi-Fi technologies, e.g., 802.11mc with 80 MHz and 802.11az with 160 MHz. Therefore, the UWB is only used as the representative technology with the higher achievable accuracy in the embodiments. Certain embodiments of the present disclosure provide the advantages of achieving sub-meter localization accuracy (<1 m) with this solution. This provides greater localization accuracy than current solutions that use only Wi-Fi localization. Certain embodiments achieve UWB-like localization accuracy (<1 m) without the need for high UWB anchors' density (high cost), or when there is insufficient UWB measurement available.

Certain embodiments can be applied to combine two or more radio technologies with different achievable ranging/positioning accuracies, as determined by the respective physical layer parameter configurations such the system bandwidth, the transmit power, the frequency band (which affects the path loss) and so on. For example, they can be applied to Wi-Fi (e.g., 40 MHz) and 5G NR (e.g., with 100 MHz). In another example, they can be applied to two different releases of Wi-Fi technologies, e.g., 802.11mc with 80 MHz and 802.11az with 160 MHz. Therefore, the UWB is only used as the representative technology with the higher achievable accuracy in the embodiments.

When one of the radio technologies is UWB, certain embodiments are especially useful for situations in which there is insufficient UWB measurement available (e.g., because of a low UWB anchors' density). In such situations, joint Wi-Fi and UWB measurements can be used to generate a localization with UWB-like localization accuracy. Accurate positioning (e.g. <1 m @ 90% CDF) can enable location based services, such as high accuracy indoor navigation, device location determination, safety and monitoring in enterprise, location-enabled troubleshooting, etc. Examples are shown in the figures below.

Although embodiments described herein relate to Wi-Fi used in combination with UWB, other technologies, such as BLUETOOTH or 3GPP LTE/5G NR used in combination with UWB is also possible. As such, certain embodiments can be applied with UWB in combination with BLUETOOTH or 3GPP LTE/5G NR as well.

Certain embodiments provide a joint UWB and out-of-band channel positioning method, including: obtaining a first candidate location of a target based on roundtrip out-of-band signals communicated between the target and out-of-band anchors on an out-of-band channel; generating second candidate locations of the based on roundtrip UWB signals communicated between the target and UWB anchors; and selecting one of the second candidate locations as the position of the target based on a proximity of each of the second candidate locations to the first candidate location. Certain embodiments provide UWB anchors used for UWB ranging are selected based on their proximity to the first candidate location. Certain embodiments provide out-of-band anchors and the UWB anchors are separate nodes in a wireless system; or one or more nodes in the wireless system can function as an out-of-band anchor and a UWB anchor. Certain embodiments provide UWB anchors that can be activated or configured using command or configuration signals sent on the out-of-band channel from at least one of the out-of-band anchors to the UWB anchors.

Figure 10:
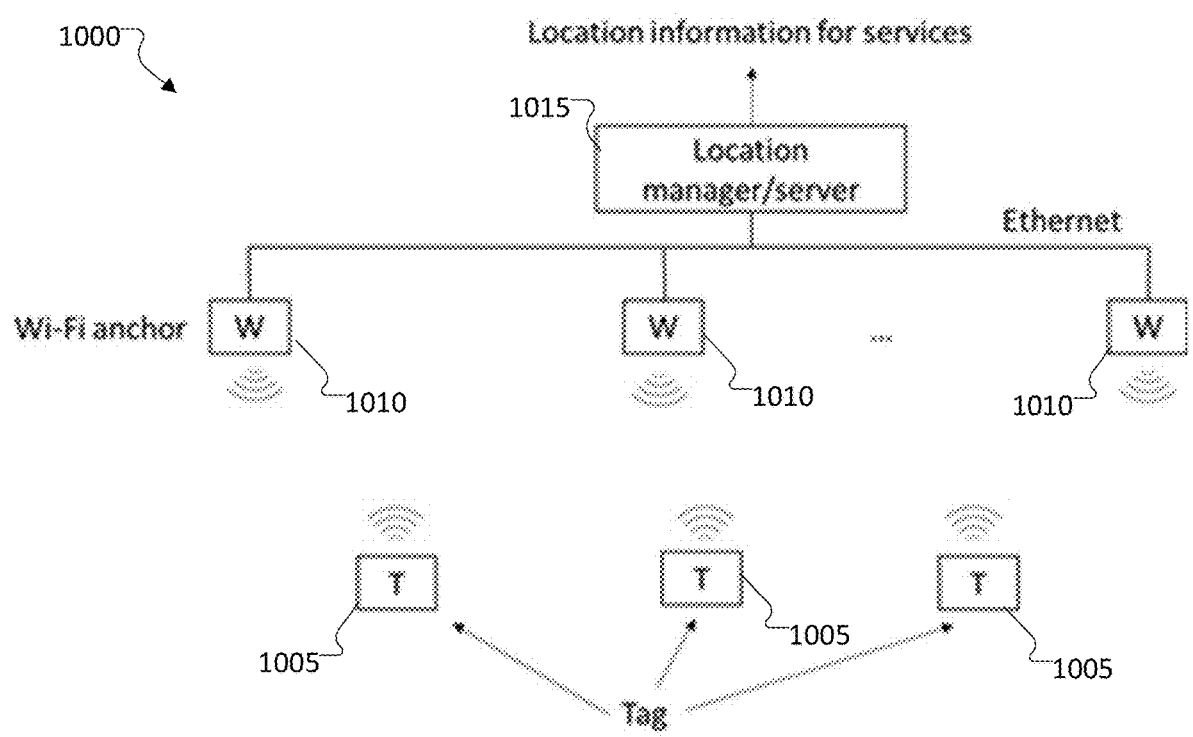
FIG. 10 illustrates a real-time localization system (RLTS) using joint Wi-Fi anchors according to embodiments of the present disclosure.

FIG. 10 illustrates a RTLS using joint Wi-Fi anchors according to embodiments of the present disclosure. The embodiment of the RTLS using joint Wi-Fi anchors shown in FIG. 10 is for illustration only. Other embodiments could be used without departing from the scope of the present disclosure.

In the example shown in FIG. 10, a RTLS includes a network 1000 with multiple Wi-Fi anchors, locating one or more target devices. Although the example target devices 1005 are shown as tags, any sort of target device is possible (e.g., UE, a STA, and the like). For example, the target device 1005 can be the same as, or similar to UE 110 The Wi-Fi anchors 1010 are connected via Ethernet to a location manager 1015 or server, which processes the information to and from the Wi-Fi anchors 1010 for positioning purpose. The positioning result can then be used for various location-based services (LBS). It is noted that the Wi-Fi anchors 1015 can also be replaced with other anchor types, such as BLUETOOTH anchors, or 3GPP LTE/5G NR base stations (with positioning technology). Without loss of generality, Wi-Fi anchors 1015 are assumed for a joint positioning system with UWB anchors in embodiments of this disclosure. The target device 1005 contains a communication module that can establish a wireless communication channel between the target device 1005 and the Wi-Fi anchors 1010 and perform communication via the established communication channel. The communication module may include one or more communication processors and supports a wireless communication. In certain embodiments, the communication module may include a wireless communication module (e.g., a cellular communication module, a short-range wireless communication module (such as UWB and BLUETOOTH), or a global navigation satellite system (GNSS) communication module). These various types of communication modules may be implemented as a single component (e.g., a single chip), or may be implemented as multi components (e.g., multi chips) separate from each other.

Figure 11A:
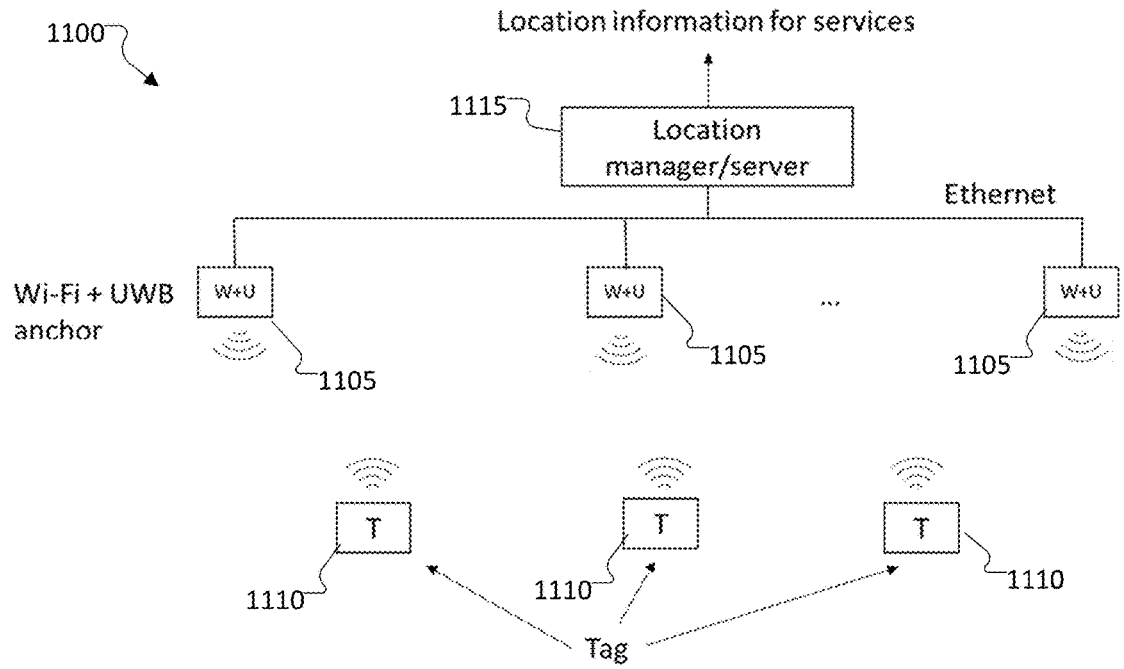
FIGS. 11A and 11B illustrates examples of RTLS using Wi-Fi and Ultra-Wide Band (UWB) anchors according to embodiments of the present disclosure.
Figure 11B:
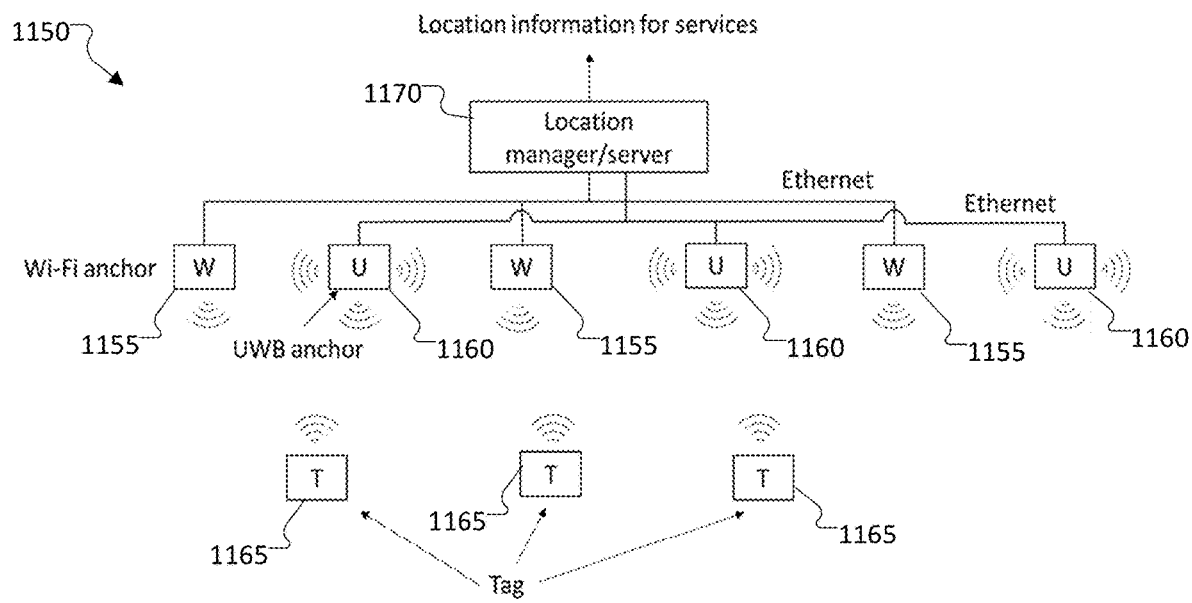

FIGS. 11A and 11B illustrates a RTLS jointly using Wi-Fi anchors and UWB anchors according to embodiments of the present disclosure. The embodiments of the RTLS jointly using Wi-Fi anchors and UWB anchors shown in FIGS. 11A and 11B are for illustration only. Other embodiments could be used without departing from the present disclosure.

In the example shown in FIG. 11A, a RTLS includes a network 1100 with multiple anchors 1105, locating one or more target devices 1110. The anchors 1110 are connected via Ethernet to a location manager 1115 or server, which processes the information to and from the anchors 1110 for positioning purpose. In certain embodiments, the anchors 1110 include both Wi-Fi and UWB positioning capability. The positioning system utilizes Wi-Fi and UWB positioning capability jointly to enhance the localization accuracy that is otherwise possible with Wi-Fi capability alone.

In the example shown in FIG. 11B, a RTLS includes a network 1150 with multiple separate physical Wi-Fi anchors 1155 and UWB anchors 1160, locating one or more target devices 1165. The Wi-Fi anchors 1155 and UWB anchors 1160 are each connected via Ethernet to a location manager 1170 or server, which processes the information to and from the Wi-Fi anchors 1155 and UWB anchors 1160 for positioning purpose. The location manager 1170, or server, processes the information to and from the anchors for positioning purpose. It should be noted that BLUETOOTH low energy (BLE) can also be utilized in this system, for example as a way to achieve device discovery, or as an additional source of ranging/localization measurement information. The BLUETOOTH node can be included in the same anchor unit as the Wi-Fi or UWB anchor, in a separate unit, or a combination thereof.

FIGS. 12A-12C illustrate example localization frameworks jointly processing the Wi-Fi and UWB based range estimates according to embodiments of the present disclosure. The embodiments of the frameworks shown in FIGS. 12A-12C are for illustration only. Other embodiments could be used without departing from the scope of the present disclosure.

Based on the Wi-Fi and UWB range estimates, certain embodiments provide several ways to jointly process the estimates to generate an estimated position of the tag. A first framework for processes the estimates is in FIG. 12A, where the available range estimates from both Wi-Fi 1205 and UWB 1210 can be jointly processed in a localization engine 1215 that implements a trilateration method, EKF, particle filter or other methods to generate a position estimate 1220 of the tag. In the example of a localization engine 1215 that implements the EKF, the input to the localization engine can be the range estimates obtained based on Wi-Fi signals and UWB signals. In the example of a localization engine 1215 that implements the particle filter, the input to the localization engine 1215 can be the candidate position estimate and its weight (i.e., likelihood) obtained based Wi-Fi signals and on UWB signals. In certain embodiments, the localization engine 1215 can apply a weighting to one or the inputs based on a degree of confidence of the location accuracy of the input. For example, a Wi-Fi may have a range estimate error of ~2 meters (m) while a UWB may have a range estimate error of ~10 centimeters (cm). As such, the localization engine 1215 can apply a weighting to the UWB range estimates 1210 such that the UWB range estimates 1210 affects the position estimate 1220 more than the Wi-Fi range estimates 1205 estimate.

A second framework is shown in FIG. 12B. In the second framework 1225 the Wi-Fi range estimates 1205 and the UWB range estimates 1210 are first processed separately in the respective localization engines (again, with any of the methods mentioned above, e.g., EKF, particle filter). In the example of a Wi-Fi localization engine 1230 that implements the EKF, the input to the Wi-Fi localization engine 1230 can be the range estimates obtained based on Wi-Fi signals. In the example of a Wi-Fi localization engine 1230 that implements the particle filter, the input to the Wi-Fi localization engine 1230 can be the candidate position estimate and its weight (i.e., likelihood) obtained based on Wi-Fi signals. In the example of a UWB localization engine 1235 that implements the EKF, the input to the UWB localization engine 1235 can be the range estimates obtained based on UWB signals. In the example of a UWB localization engine 1235 that implements the particle filter, the input to the UWB localization engine 1235 can be the candidate position estimate and its weight (i.e., likelihood) obtained based on UWB signals. Then, the results (one set for W-Fi, and another for UWB) that can consist of the estimated positions and potentially the corresponding measure of confidence of the estimates (e.g. this can be obtained from the variance of the EKF state variables (coordinates of the tag)), can be further processed jointly in a localization fusion engine 1240 to produce the final estimated position 1220 of the tag. One example of the fusion processing can be to perform weighted average of the estimates from Wi-Fi and UWB based on the confidences of the estimates. The frameworks 1200 and 1225 can be applied for network-side processing or device-side processing (at the tag).

In a third framework 1250, as shown in FIG. 12C, the Wi-Fi range estimates 1205 are first processed separately in Wi-Fi localization engine 1230 (again, with any of the methods mentioned above, e.g., EKF, particle filter) while UWB range estimates 1210 are input directly into localization fusion engine 1240. In the example of the Wi-Fi localization engine 1230 that implements the EKF, the input to the Wi-Fi localization engine 1230 can be the range estimates obtained based on Wi-Fi signals. In the example of the Wi-Fi localization engine 1230 that implements the particle filter, the input to the Wi-Fi localization engine 1230 can be the candidate position estimate and its weight (i.e., likelihood) obtained based on Wi-Fi signals. Then, the results from the Wi-Fi localization engine 1230 that can consist of the estimated positions and potentially the corresponding measure of confidence of the estimates (e.g. this can be obtained from the variance of the EKF state variables (coordinates of the tag)), can be further processed jointly with the UWB range estimates 1210 in a localization fusion engine 1240 to produce the final estimated position 1220 of the tag. One example of the fusion processing can be to perform weighted average of the estimates from Wi-Fi and UWB based on the confidences of the estimates. The frameworks 1200, 1225, 1250 can be applied for network-side processing or device-side processing (at the tag).

Figure 13:
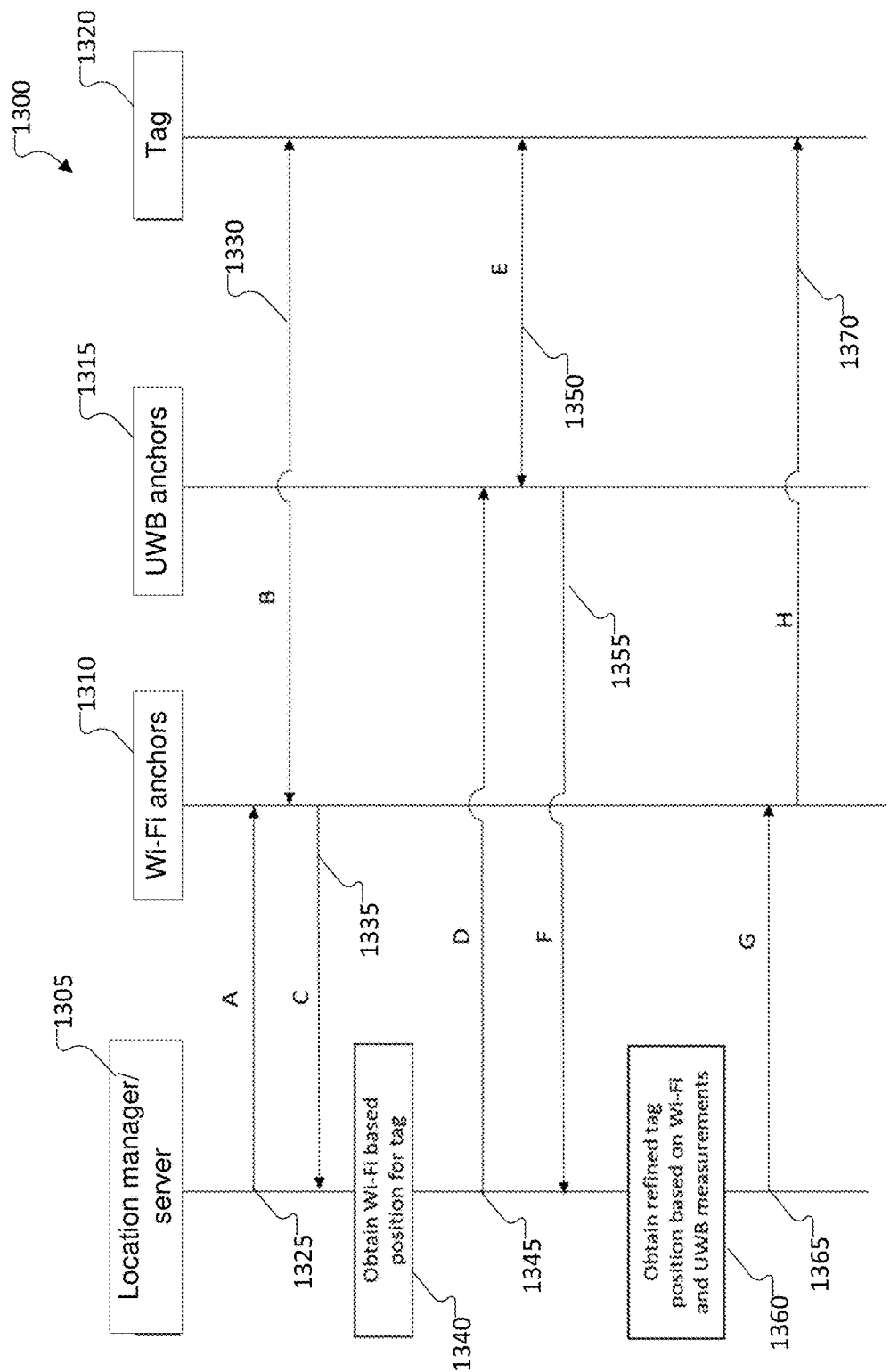
FIG. 13 illustrates example RTLS protocol according to embodiments of the present disclosure.

FIG. 13 illustrates example real-time locating system protocol according to embodiments of the present disclosure. While the signaling diagram depicts a series of sequential steps or signals, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by processing circuitry in respective servers, APs, and UEs.

For an RTLS with the architectures of network 1100 or FIG. 11A or network 1150 of FIG. 11B, a localization protocol framework process 1300 can be as illustrated in FIG. 13. The localization protocol framework process 1300 illustration is simplified for brevity and it is understood that there can be more messaging between nodes in an actual system. In the example shown in FIG. 13, the localization protocol framework process 1300 includes signals between location server 1305, Wi-Fi anchors 1310, UWB anchors 1315, and tags 1320. The location server 1305 can first transmit a request (A) 1325 to Wi-Fi anchors 1310 to perform a localization procedure (B) 1330 for a tag 1320, which can be based on an RTT, time-of-flight (TOF), time-difference-of-arrival (TDOA) procedure or others. Note that RTT is a TOF technique, which is essentially a two-way ranging procedure as shown in FIG. 7. The Wi-Fi anchors 1310 feedback their measurement results (C) 1335 to the server 1305. The measurement results can be the range estimates for an RTT or TOF procedure, or time stamps of received signals from the tag for an UL TDOA procedure. In operation 1340, the server 1305 generates a Wi-Fi based positioning result of the tag ((x, y), or (x, y, z) in the anchors' coordinate system) based on the aggregated measurement results, such as the trilateration methods, EKF, particle filter as mentioned before. To achieve better localization accuracy, the server 1305 can send a request (D) 1345 to the UWB anchors 1315 to perform a localization procedure (E) 1350 on the tag 1320, which can be based on a RTT, TOF, TDOA procedure or others. Then, the UWB anchors 1315 feedback their measurement results (F) 1355 to the server 1305. Similarly, the measurement results can be the range estimates for an RTT or TOF procedure, or time stamps of received signals from the tag for an UL TDOA procedure. Based on the UWB measurement results as well as the Wi-Fi measurement/positioning result, the location server 1305 can generate a revised location estimate of the tag with better accuracy in operation 1360. If the revised location estimate is needed at the tag, the revised location estimate can be sent by the location server to the Wi-Fi network (G) 1365, which can then be forwarded to the tag (H) 1370. For the architecture of the network 1100 in FIG. 11A, each physical node consists of a Wi-Fi anchor and a UWB anchor, whereas in architecture of the network 1150 in FIG. 11B, the Wi-Fi anchor and the UWB anchor are different physical nodes.

In certain embodiments, before the UWB localization procedure 1350 is performed between the UWB anchors 1315 and the tag 1320, the Wi-Fi anchors 1310 can send signaling command via the Wi-Fi channel to activate the UWB module in the tag 1320, and also send the necessary UWB configuration information to the tag 1320 (contained in the Wi-Fi packet), so that the tag 1320 can be prepared to receive/transmit UWB signals with the UWB anchors 1315. The tag 1320 responds to the signaling command by activating the UWB module and applying the configuration information to the tag's UWB module.

The UWB configuration information can include, but is not limited to, the UWB frequency channel(s) (or channel number(s)), STS (scrambled timestamp sequence) packet configuration (for secured ranging), ranging/localization method (SS/DS-TWR, DL/UL TDOA), authentication/security information, MAC addresses of UWB anchors, ranging interval, preamble configuration (e.g. preamble code index, preamble duration), UWB PRF (pulse repetition frequency) mode and other control information needed to support the necessary UWB PHY/MAC procedures. In certain embodiments, the function of UWB discovery signaling, the setup configuration signaling, or both, can also be performed by other radio technology or network such as the 3GPP LTE/5G NR radio technology/network.

Figure 14:
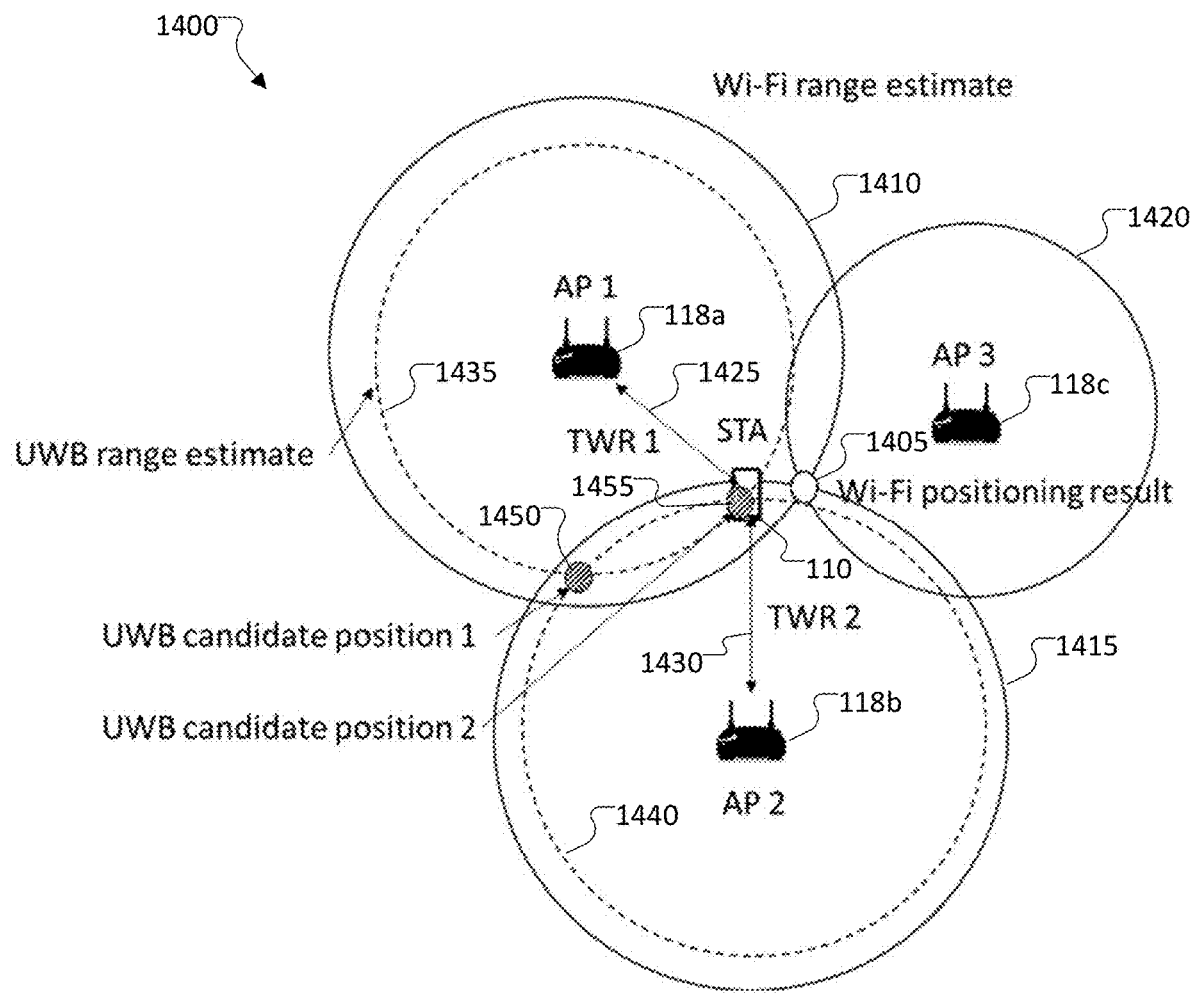
FIG. 14 illustrates an example joint Wi-Fi and UWB positioning system according to embodiments of the present disclosure.

FIG. 14 illustrates an example joint Wi-Fi and UWB positioning system according to embodiments of the present disclosure. The example scenario 1400 of the joint Wi-Fi and UWB positioning system using the procedure 1500 described herein below with respect to FIG. 15. For simplicity, it is assumed in the example scenario 1400 that the Wi-Fi anchors and the UWB anchors are co-located, that is, in the same access point or router box. However, the joint Wi-Fi and UWB positioning system can also be realized with non-co-located Wi-Fi anchors and UWB anchors.

In this example shown in FIG. 14, the initial Wi-Fi based position 1405 is obtained from the Wi-Fi-based range estimates using AP 1 118a, AP 2 118b, and AP 3 118c. To determine the Wi-Fi based position 1405, each of AP 1 118a, AP 2 118b, and AP 3 118c reports its distance measurement estimates to the server. For example, AP 1 118a reports that UE 110 at a first detected distance 1410, AP 2 118b reports UE 110 a second detected distance 1415, and AP 1 118c reports that UE 110 at a third detected distance 1420. The server identifies a most likely convergence or intersection of the radii of the three distances 1410, 1415, 1420 and selects the intersection as the Wi-Fi based position 1405 representing the estimated position UE 110. The initial Wi-Fi based position 1405 is indicated in FIG. 14 with a significant error to the true location of the UE 110 (the tag). For example, an error of 5 to 15 m error is not uncommon in practice (e.g. due to limited bandwidth of Wi-Fi). AP 1 118a and AP 2 118b then perform two-way ranging (TWR) with the UE 110 (TWR 1 and TWR 2), and obtain a first range estimate 1425 between AP 1 118a and UE 110, and second range estimate 1430 between AP 2 118b and UE 110. Assuming the APs 118 are all capable of UWB ranging, there can be a selection procedure of the APs to perform UWB ranging with the tag (UE 110). In one example, the APs 118 selected can be the APs 118 with the best Wi-Fi based RSSI measurements with UE 110. In another example, the APs 118 selected can also be predetermined from the planning phase of the system deployment. The selection procedure can be performed by the location manager/server. In certain embodiments, it is also possible to be performed by the tag particularly for a device-side positioning system (position estimate is calculated at the device side).

Each of AP 1 118a and AP 2 perform UWB range estimating. AP 1 118a obtains a first UWB range estimate 1435 to UE 110 and AP 2 118b obtains a second range estimate 1440 to UE 110. Based on the UWB range estimates, two candidate positions can be determined, indicated as "UWB candidate position 1" 1450 and "UWB candidate position 2" 1455. The UWB candidate position that is closest to the initial Wi-Fi based position 1405 is "UWB candidate position 2" 1455. Therefore, in this example, the final result of the joint Wi-Fi and UWB positioning system is "UWB candidate position 2" 1455.

Figure 15:
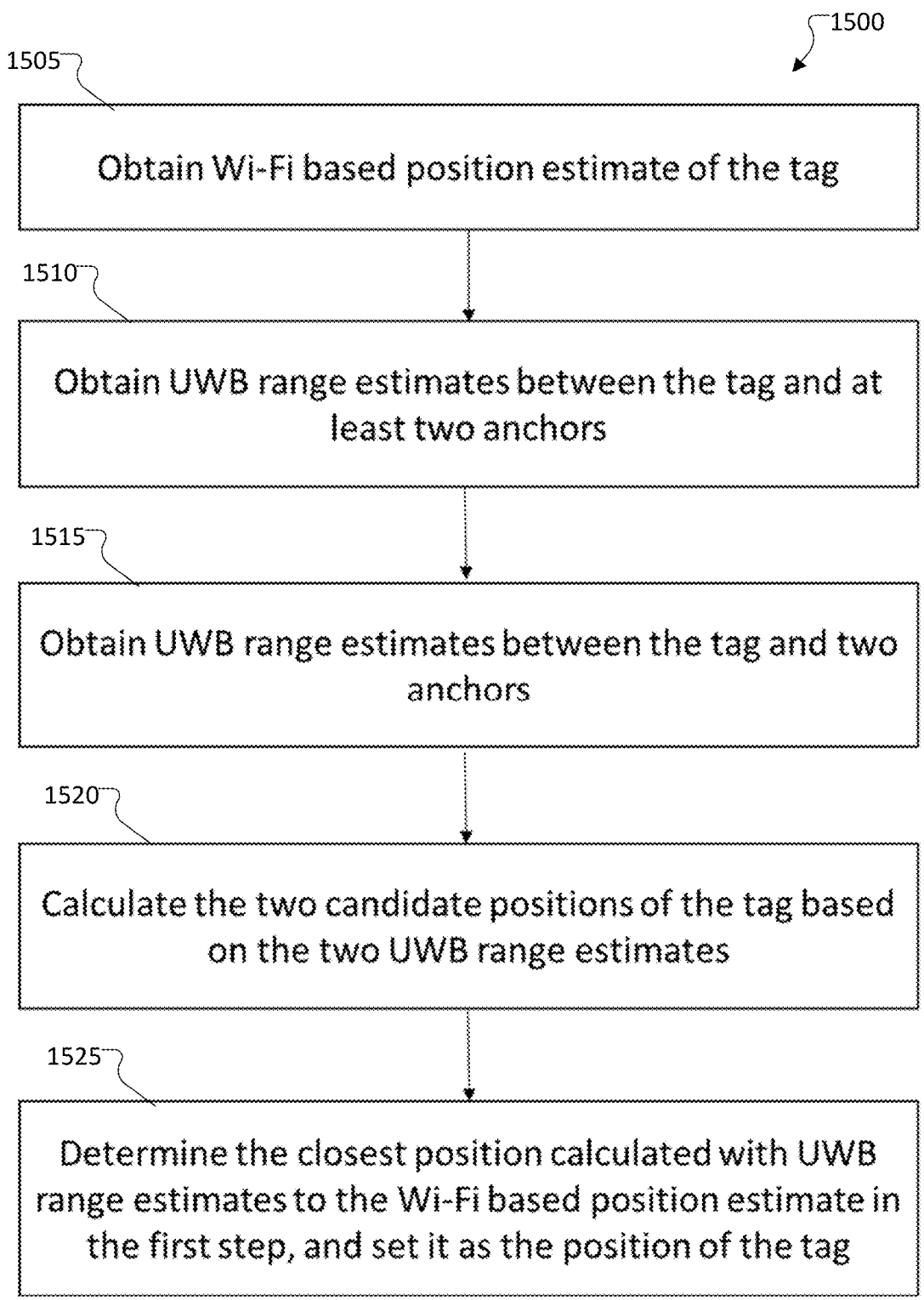
FIG. 15 illustrates a process for joint Wi-Fi and UWB positioning according to embodiments of the present disclosure.

In certain embodiment, in the fusion framework 1250 illustrated in FIG. 12C, the "localization fusion engine" 1240 performs the procedure as described in FIG. 15.

FIG. 15 illustrates a process for joint Wi-Fi and UWB positioning according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server.

In the example shown in FIG. 15, two-dimensional (2D) localization is assumed, but location measurements and determinations are equally applicable to three-dimensional (3D) localization. It is noted that 2D localization produces a position estimate (x,y), and 3D localization produces a position estimate (x,y,z). To estimate 2D without ambiguity, at least three anchors are required. Using more anchors can provide a more accurate result. In operation 1505, a Wi-Fi based position estimate of the tag is obtained using a Wi-Fi positioning system. Wi-Fi based measurement can be performed using the Wi-Fi RTT procedure, signal strength-based procedure or fingerprint-based procedure. In operation 1510, UWB range estimates between the tag and at least two UWB anchors are obtained. This can be performed using a TWR procedure (e.g., based on IEEE 802.15.4a or IEEE 802.15.4z protocols). UWB range measurement can also be performed with other TOF based procedures. In operation 1515, assuming two UWB anchors were used (or the best two UWB anchors were selected), UWB range estimates between the tag and the two selected anchors is obtained. In operation 1520, two candidate positions of the tag can be obtained—one candidate position for each UWB anchor. Alternatively, the two candidate positions can also be obtained using a TDOA based procedure. In operation 1525, the position calculated with UWB measurements that is closest to the Wi-Fi based position that estimated in operation 1505 is determined. The result of operation 1525 is used as the position estimate of the tag in this joint Wi-Fi and UWB positioning system.

It is noted that the procedure 1500 can be easily extended to 3D localization, by using at least three UWB anchors to obtain the UWB range estimates in operation 1510. It is also noted that the Wi-Fi positioning in FIG. 15 can also be replaced with other positioning technology, such as Bluetooth based positioning, GPS positioning or other Global Navigation Satellite System (GNSS). As an example, if the UWB anchors are deployed outdoor, then a joint GPS and UWB positioning system can be implemented based on the solution described in this disclosure.

Figure 16:
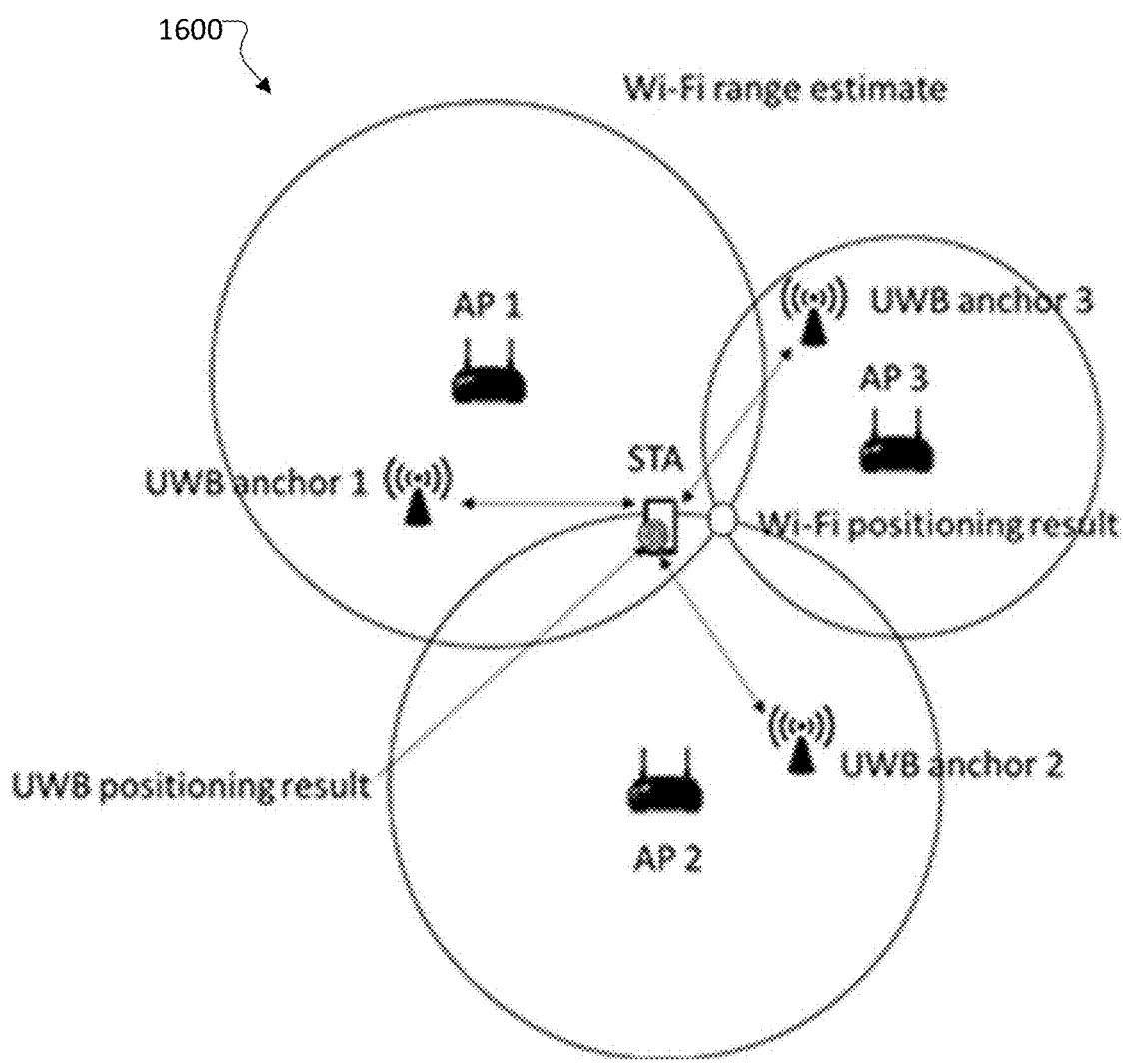
FIG. 16 illustrates another example joint Wi-Fi and UWB positioning system according to embodiments of the present disclosure.

FIG. 16 illustrates another example joint Wi-Fi and UWB positioning system according to embodiments of the present disclosure. The example scenario 1600 shown in FIG. 16 is for illustration only. Other examples could be used without departing from the scope of the present disclosure.

In the scenario 1600 depicted in FIG. 16, the Wi-Fi anchors and UWB anchors are separate physical nodes or APs. In operation 1505, Wi-Fi based position estimate of the tag is obtained using a Wi-Fi positioning system. This can be performed using the Wi-Fi RTT procedure, signal strength-based procedure or fingerprint-based procedure. Based on the Wi-Fi based position estimate, a selection of UWB anchors is performed to further perform a UWB based localization procedure with the tag. In one example, the UWB anchors selected can be a set of N UWB anchors closest to the Wi-Fi based position estimate (e.g., within a particular neighborhood or range from the Wi-Fi based position), where the set size (N) can be predetermined according to the desired localization dimensions (2D or 3D) and/or localization accuracy. For example, the set size can be 3, 4 or 5. In the example of FIG. 16, the set size N is equal to 3. In another example, the selection criteria include a distance threshold between a UWB anchor candidate and the Wi-Fi based position estimate. A UWB anchor can be included for UWB based ranging/localization procedure if the distance between the UWB anchor and the Wi-Fi based position estimate is smaller than a predetermined threshold, since smaller distance typically correlates with better signal quality. In another example, the selection criteria include the angular distribution of the UWB anchors with respect to the Wi-Fi based position estimate. In particular, the UWB anchors can be selected to have wide angular distributions with respect to the Wi-Fi based position estimate to minimize the dilution of precision due to the set of UWB anchors' position. Other selection procedures are also possible. Next, a UWB based localization procedure is performed between the UWB anchors and the tag, such as that based on two way ranging (TWR) procedure (e.g., based on IEEE 802.15.4a or IEEE 802.15.4z protocols), or TDOA procedure. The result of the UWB based localization procedure from this system is the final position estimate of the tag. The procedure is given in FIG. 17.

Figure 17:
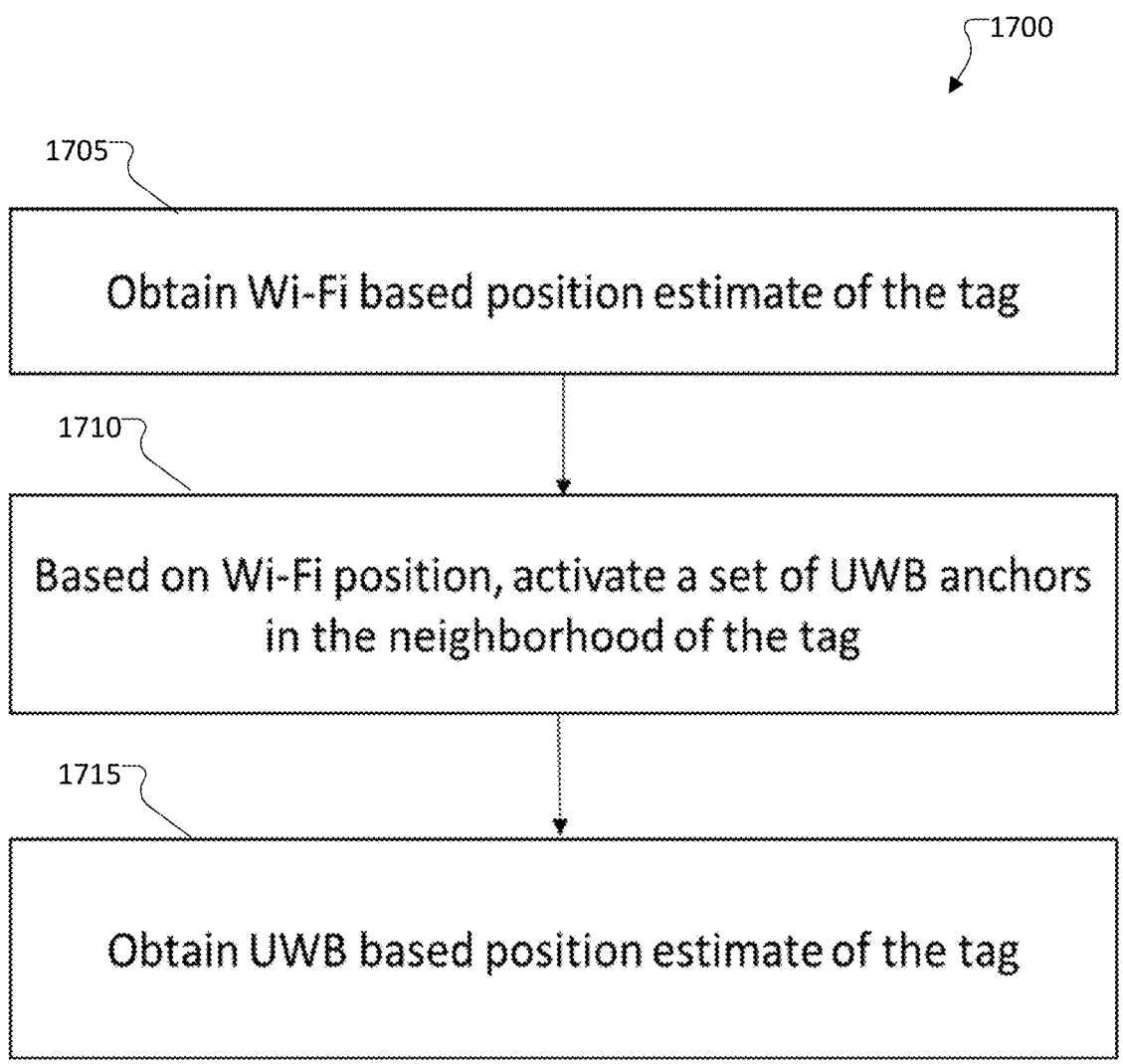
FIG. 17 illustrates another process for joint Wi-Fi and UWB positioning according to embodiments of the present disclosure.

FIG. 17 illustrates another process for joint Wi-Fi and UWB positioning according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server.

In operation 1705, the server obtains a Wi-Fi based position of the tag using a Wi-Fi positioning system. Wi-Fi based measurement can be performed using the Wi-Fi RTT procedure, signal strength-based procedure or fingerprint-based procedure. In operation 1710, based on the Wi-Fi position, the server activates a set of UWB anchors in proximity (for example, nearest) of the tag. In operation 1715, based the activation of the UWB anchors to perform UWB measurements, the server obtains a UWB based position estimate of the tag.

Figure 18:
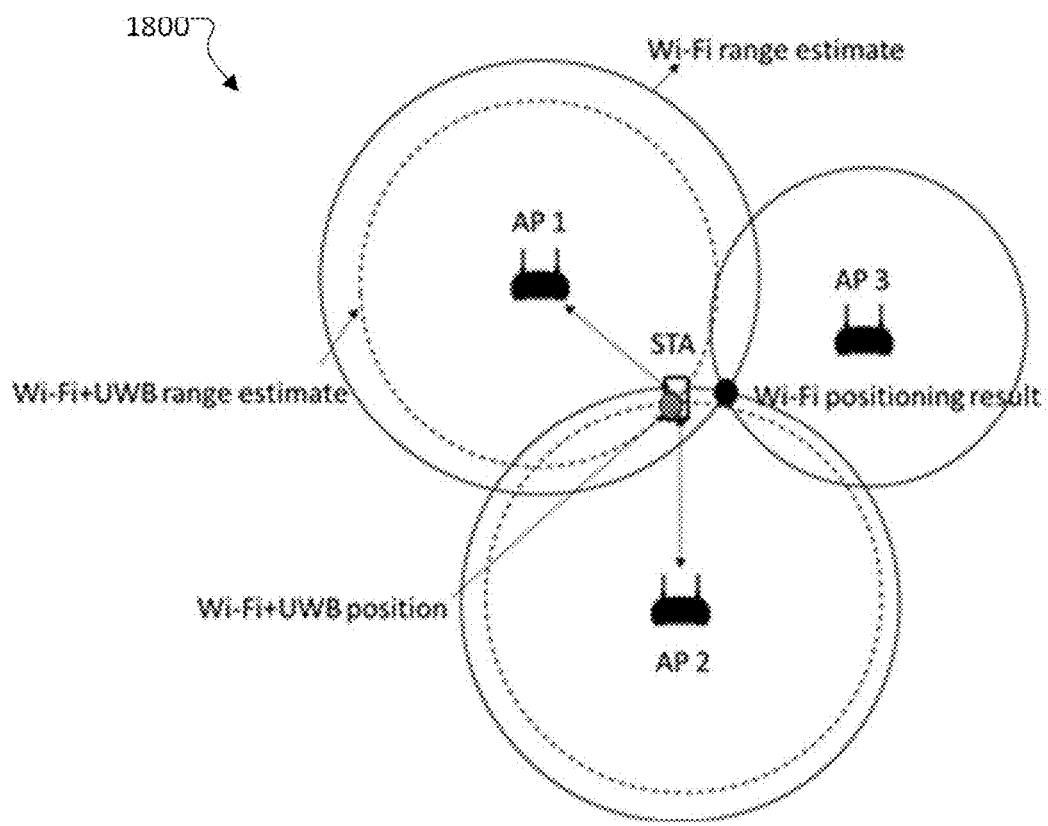
FIG. 18 illustrates another example joint Wi-Fi and UWB positioning system according to embodiments of the present disclosure.

FIG. 18 illustrates another example joint Wi-Fi and UWB positioning system according to embodiments of the present disclosure. The example network 1800 shown in FIG. 18 is for illustration only. Other examples could be used without departing from the scope of the present disclosure.

In the network 1800 depicted in FIG. 18, a pair of Wi-Fi anchor and UWB anchor is in the same physical node or AP. Multi-channel ranging, involving the Wi-Fi and UWB channels can be performed to enhance the ranging resolution via increase of the effective bandwidth. The network can perform a localization measurement process 1900 below.

Figure 19:
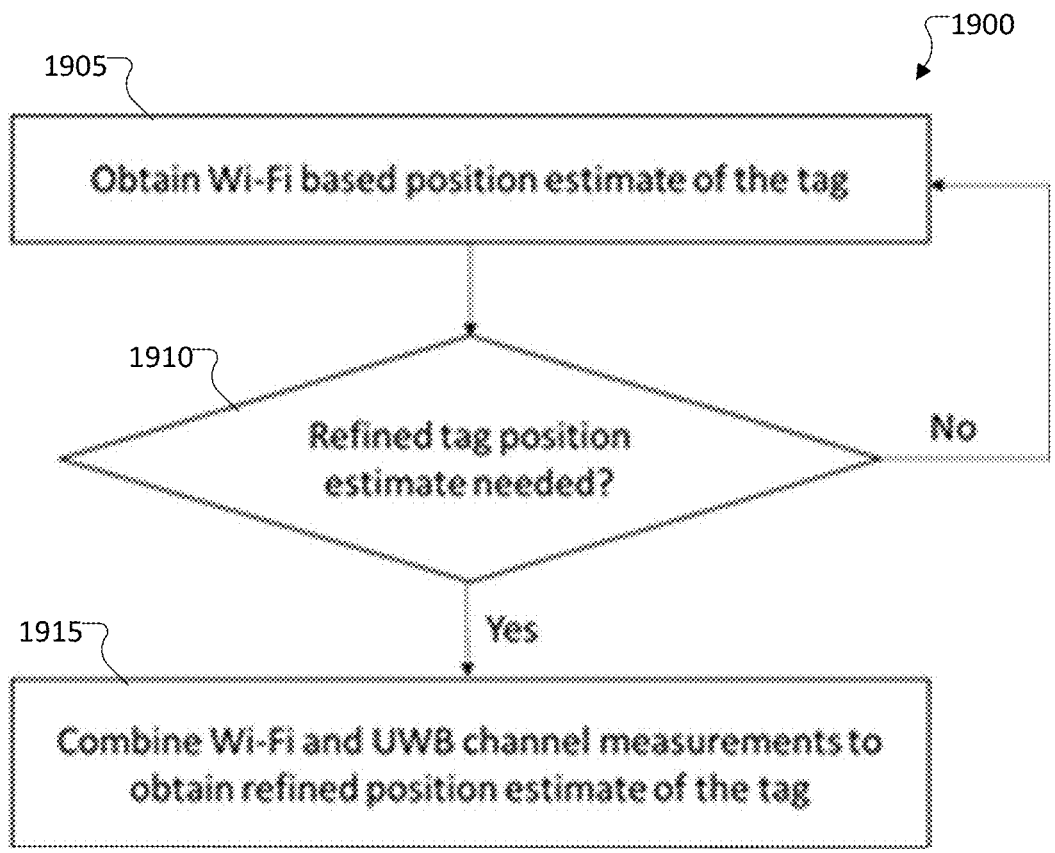
FIG. 19 illustrates a determination process for joint Wi-Fi and UWB positioning according to embodiments of the present disclosure.

FIG. 19 illustrates a determination process for joint Wi-Fi and UWB positioning according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server.

In operation 1905, Wi-Fi based procedure can be performed to obtain a first channel impulse response (CIR) or channel state information (CSI). In operation 1910, the server determines whether a refined tag position is needed. The server can determine whether a refined position is needed based on a number of criteria including: degree of confidence in the accuracy based on technology, user input, signal strength, and the like. If the server determines that refinement is not required, the server continues to obtain Wi-Fi based position in operation 1905. If the need for an improved localization accuracy is determined, a UWB based procedure is performed to obtain a second CIR or CSI. In operation 1915, enhanced range estimate can be obtained by generating a joint CIR/CSI from the CIR/CSI of the Wi-Fi channel and the CIR/CSI of the UWB channel and processing the joint CIR/CSI to obtain the enhanced range estimate. The enhanced range estimate from the multi-channel processing can then be used to produce the localization result. There are also other range resolution enhancement techniques with multi-channel processing that can be applied.

Figure 20:
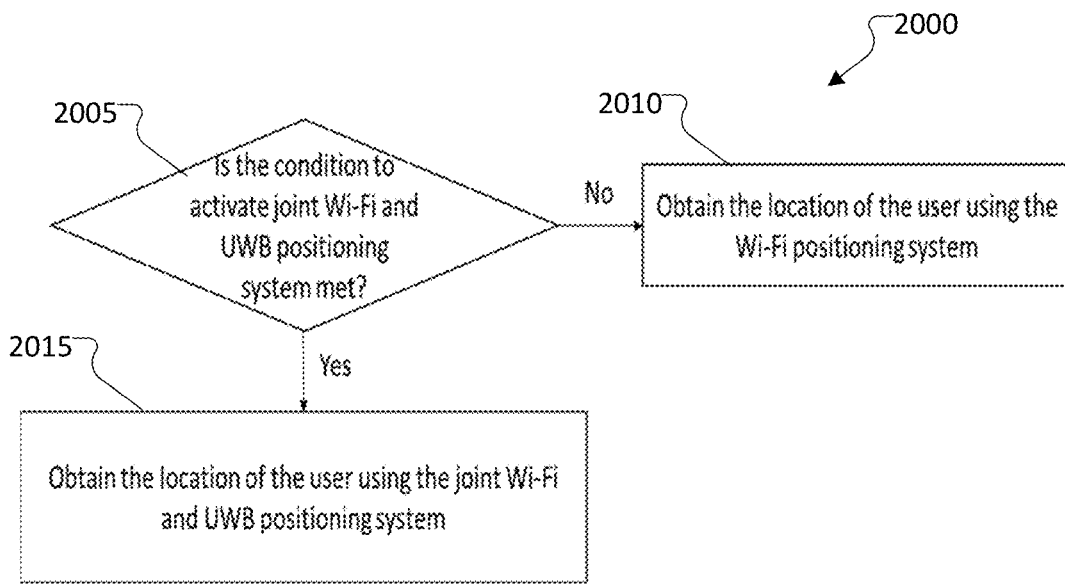
FIG. 20 illustrates a process for joint Wi-Fi and UWB positioning system activating condition according to embodiments of the present disclosure.

FIG. 20 illustrates a process for joint Wi-Fi and UWB positioning system activating condition according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server.

In certain embodiments, it can be beneficial to operate the joint Wi-Fi and UWB positioning system (e.g., any of the example joint positioning systems discussed above) for a tag requiring the positioning service, depending on whether a certain condition is met or not. Operating the joint Wi-Fi and UWB positioning system based on a condition can be to reduce the need for the UWB anchors to perform TWR with all the tags within the coverage region in order to avoid the issue of UWB capacity limitation (limited number of UWB tags). It can also to reduce the power consumption of the tag by reducing the active time of the UWB module in the tag. Therefore, a positioning system can be operated as illustrated in FIG. 20, wherein if the condition to activate the joint Wi-Fi and UWB positioning system for a tag is not met, then the Wi-Fi based positioning system is used for the tag; otherwise the joint Wi-Fi and UWB positioning system is used for the tag.

In operation 2005, the server determines whether a condition to activate joint Wi-Fi and UWB positioning system is met. If the condition is not met, the server obtains the location of the UE (tag) using the Wi-Fi positioning system in operation 2010. If the condition is met, the server obtains the location of the UE using the joint Wi-Fi and UWB positioning system.

Figure 21:
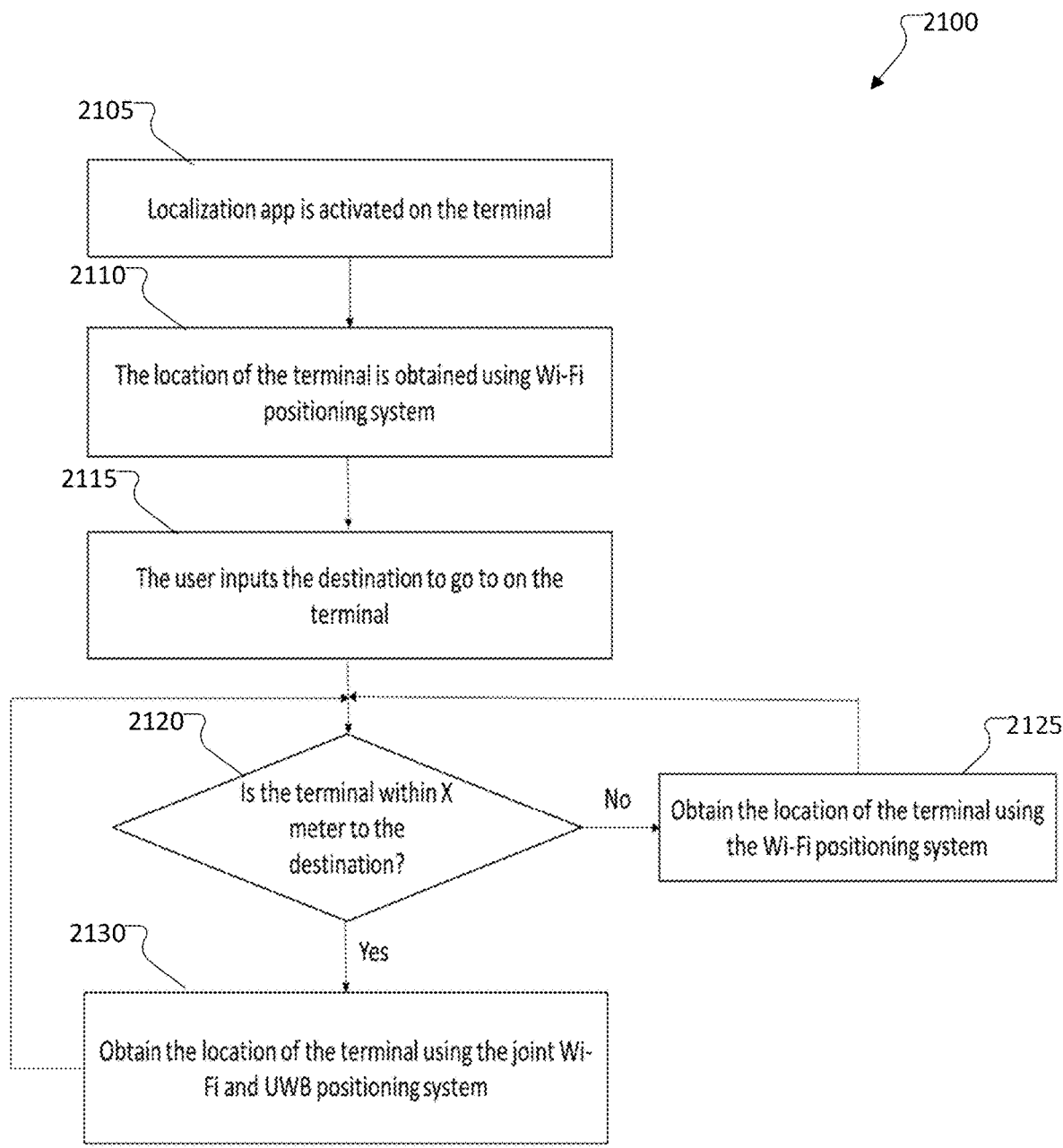
FIG. 21 illustrates a process for joint Wi-Fi and UWB positioning system activating condition according to embodiments of the present disclosure.

FIG. 21 illustrates a process for joint Wi-Fi and UWB positioning system activating condition according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server.

FIG. 21 illustrates an example of a condition to activate the joint Wi-Fi and UWB positioning system for a tag. In operation 2105, a localization app is activated on the user terminal, such as UE 110. For example, the localization app can be an indoor positioning map service. In operation 2110, after the localization service is requested by the terminal, the location of the terminal can be obtained using the Wi-Fi positioning system. Alternatively, the terminal can be provided with the localization result of the joint Wi-Fi and UWB positioning system by default. In operation 2115, the user then inputs the destination information in the terminal. This can be an address of the destination, or an object or a person with an associated destination. In operation 2120, using the current terminal location info, the server determines whether the user terminal is currently within an X meter distance to the destination. X can be configured or predetermined in deployment planning stage. For example, X can be configured or user input to be a certain distance, such as 10 m. If the condition is not satisfied, implying the user is still sufficiently far away, then the Wi-Fi positioning system is used in operation 2125. If the is within X meter distance, implying the user is close to the destination, then the joint Wi-Fi and UWB positioning system is used in operation 2130. This setup is beneficial if accurate localization result is deemed most useful when the user is close to the destination, for example to accurately identify a meeting place, a shelf location of a retail store, a person with another terminal/tag, and the like.

Figure 22:
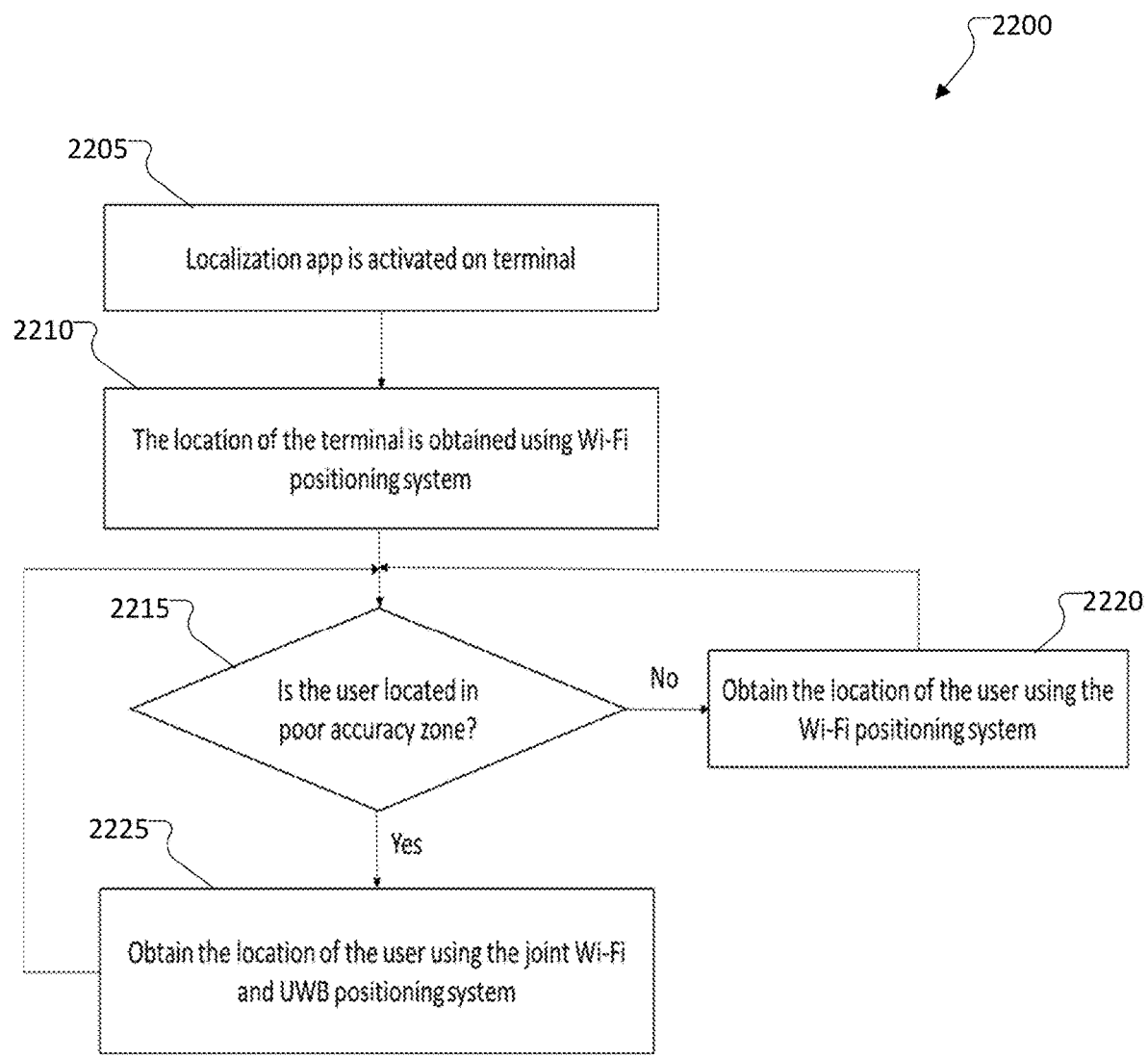
FIG. 22 illustrates a process for joint Wi-Fi and UWB positioning system activating condition according to embodiments of the present disclosure.

FIG. 22 illustrates a process for joint Wi-Fi and UWB positioning system activating condition according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server.

In certain embodiments, the joint Wi-Fi and UWB positioning system can also be activated for a different or an additional condition. For example, the joint Wi-Fi and UWB positioning system can be activated for when the user arrives at an area where the Wi-Fi positioning accuracy is not sufficient for the user to navigate, for example, likely for the user to make a wrong turn in a complex layout. The joint Wi-Fi and UWB positioning system can also be activated in an area where the Wi-Fi positioning accuracy is particularly poor, for example, due to the poor RF condition, poor Wi-Fi anchors placement, or insufficient Wi-Fi anchors placement. The insufficient Wi-Fi positioning accuracy can be detected or estimated from the RSSI between the Wi-Fi anchors and the tag, the location estimate confidence produced with the algorithm, for example, the variance of posteriori estimate of the location in an EKF algorithm, etc.

In operation 2205, a localization app is activated on the user terminal, such as UE 110. For example, the localization app can be an indoor positioning map service. In operation 2210, after the localization service is requested by the terminal, the location of the terminal can be obtained using the Wi-Fi positioning system. Alternatively, the terminal can be provided with the localization result of the joint Wi-Fi and UWB positioning system by default. In operation 2215, the server determines whether the user terminal is located within a poor accuracy zone. If the user terminal is not within a poor accuracy zone, the server uses the Wi-Fi positioning system in operation 2220. If the user terminal is within a poor accuracy zone, then the joint Wi-Fi and UWB positioning system is used in operation 2225. This setup is beneficial if accurate localization result is deemed most useful when the user is moving through areas with poor signal reception, such as within an elevator or building with limited signal reception, and the like.

Figure 23:
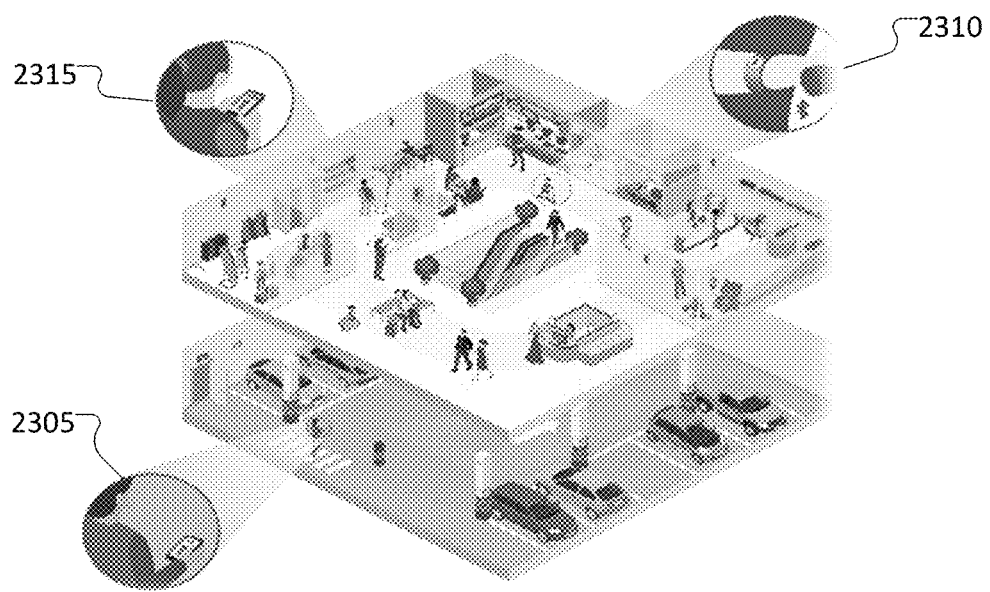
FIG. 23 illustrates an example scenario for indoor location positioning according to embodiments of the present disclosure.

FIG. 23 illustrates an example scenario for indoor location positioning according to embodiments of the present disclosure. The embodiment of the indoor location positioning shown in FIG. 23 is for illustration only. Other embodiments could be used without departing from the scope of the present disclosure.

Certain embodiments of the present disclosure can be applied to the case in which the localization engine or manager resides at the network, or at the terminal (tag, smart devices). The methods to combine the ranging and/or localization results from multiple radio technologies can be applied either at the network, or at the terminal. The localization protocol framework process 1300 as described in FIG. 13 can be applied when the localization refinement is done at the terminal if the location manager resides in the terminal, and the communication from the location manager to the Wi-Fi anchors and UWB anchors are done via the Wi-Fi and UWB modules on the terminal.

When one of the radio technologies is UWB, certain embodiments are especially useful for situations in which there is insufficient UWB measurement available (e.g., because of a low UWB anchors' density). For example, in a multi-floor shopping mall, as depicted in the example shown in FIG. 23, one or more individuals possess a smart device. That is, a first user 2305 with a smart phone is located in the parking garage. A second user 2310, with smart watch, is located in the main area of the shopping mall. A third user 2315, with a smart phone, is located with a store. In an example scenario, the second user 2310 may wish to locate and meet up with each of the first user 2305 and third user 2315. In such situations, joint Wi-Fi and UWB measurements can be used to generate a localization with UWB-like localization accuracy. Therefore, the second user 2310 can execute a location positioning application on his smart phone. The location positioning application can operate through network to locate target devices of the first user 2305 and third user 2315. The location positioning can work in three dimensions and inform the second user 2310 that the first user 2310 is at a lower level in a first direction from the second user 2310 and third user 2315 is on the same level in a certain direction from the second user 2310. Accurate positioning (e.g., <1 m@90% CDF) can enable location-based services, such as high accuracy indoor navigation, device location determination, safety and monitoring in enterprise, location-enabled troubleshooting, and the like.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a transceiver; and
a processor configured to:
obtain, via a first radio technology, a first candidate location of a target device;
select at least two anchors of a plurality of anchors based on range estimates of the plurality of anchors to the target device;
obtain, via a second radio technology, a plurality of second candidate locations of the target device from the at least two anchors; and
select one of the second candidate locations as an estimated position of the target device based on a proximity of each of the second candidate locations to the first candidate location.

2. The apparatus of claim 1, wherein the first candidate location is based on roundtrip out-of-band signals communicated between the target device and out-of-band anchors on an out-of-band channel.

3. The apparatus of claim 2, wherein the second radio technology is an ultra-wide band (UWB) protocol, and wherein:
the out-of-band anchors and UWB anchors comprise separate nodes in a wireless system; or
one or more nodes in the wireless system are configured to operate as a joint out-of-band and UWB anchor.

4. The apparatus of claim 3, wherein the processor is configured to one of:
activate the UWB anchors;
configure the UWB anchors via a command; or
transmit a configuration signal transmitted via the out-of-band channel from at least one of the out-of-band anchors to the UWB anchors.

5. The apparatus of claim 1, wherein the second radio technology is a UWB communication protocol, and wherein the processor is configured to:
generate the plurality of second candidate locations based on UWB signals communicated between the target device and UWB anchors.

6. The apparatus of claim 5, wherein the processor is configured to select at least two UWB anchors from a plurality of UWB anchors for UWB ranging based on a proximity to the first candidate location.

7. The apparatus of claim 1, wherein the first radio technology comprises one of:
a Wi-Fi, a BLUETOOTH, Global Positioning System (GPS) positioning, or other Global Navigation Satellite System (GNSS).

8. A method comprising:
obtaining, via a first radio technology, a first candidate location of a target device;
selecting at least two anchors of a plurality of anchors based on range estimates of the plurality of anchors to the target device;
obtaining, via a second radio technology, a plurality of second candidate locations of the target device from the at least two anchors; and
selecting one of the second candidate locations as an estimated position of the target device based on a proximity of each of the second candidate locations to the first candidate location.

9. The method of claim 8, wherein the first candidate location is based on roundtrip out-of-band signals communicated between the target device and out-of-band anchors on an out-of-band channel.

10. The method of claim 9, wherein the second radio technology is an ultra-wide band (UWB) protocol, and wherein:
the out-of-band anchors and UWB anchors comprise separate nodes in a wireless system; or
one or more nodes in the wireless system are configured to operate as a joint out-of-band and UWB anchor.

11. The method of claim 10, further comprising:
activating the UWB anchors;
configuring the UWB anchors via a command; or
transmitting a configuration signal transmitted via the out-of-band channel from at least one of the out-of-band anchors to the UWB anchors.

12. The method of claim 8, wherein the second radio technology is a UWB communication protocol, and wherein obtaining the plurality of second candidate locations comprises generating the plurality of second candidate locations based on UWB signals communicated between the target device and UWB anchors.

13. The method of claim 12, further comprising selecting at least two UWB anchors from a plurality of UWB anchors for UWB ranging based on a proximity to the first candidate location.

14. The method of claim 8, wherein the first radio technology comprises one of:
a Wi-Fi, a BLUETOOTH, Global Positioning System (GPS) positioning, or other Global Navigation Satellite System (GNSS).

15. A non-transitory computer readable medium comprising a plurality of instructions that, when executed by at least one processor, cause the processor to:
obtain, via a first radio technology, a first candidate location of a target device;
select at least two anchors of a plurality of anchors based on range estimates of the plurality of anchors to the target device;
obtain, via a second radio technology, a plurality of second candidate locations of the target device from the at least two anchors; and
select one of the second candidate locations as an estimated position of the target device based on a proximity of each of the second candidate locations to the first candidate location.

16. The non-transitory computer readable medium of claim 15, wherein the first candidate location is based on roundtrip out-of-band signals communicated between the target device and out-of-band anchors on an out-of-band channel,
wherein the second radio technology is an ultra-wide band (UWB) communication protocol, and
wherein the instructions are further configured to cause the processor to:
generate the plurality of second candidate locations based on UWB signals communicated between the target device and UWB anchors.

17. The non-transitory computer readable medium of claim 16, wherein:
the out-of-band anchors and the UWB anchors comprise separate nodes in a wireless system; or one or more nodes in the wireless system are configured to operate as a joint out-of-band and UWB anchor.

18. The non-transitory computer readable medium of claim 17, wherein the instructions are further configured to, when executed, cause the processor to one of:
   activate the UWB anchors;
   configure the UWB anchors via a command; or
   transmit a configuration signal transmitted via the out-of-band channel from at least one of the out-of-band anchors to the UWB anchors.

19. The non-transitory computer readable medium of claim 18, wherein the instructions are further configured to, when executed, cause the processor to:
   generate the plurality of second candidate locations based on the UWB signals communicated between the target device and the UWB anchors, and
   select at least two UWB anchors from a plurality of UWB anchors for UWB ranging based on a proximity to the first candidate location.

20. The non-transitory computer readable medium of claim 15, wherein the first radio technology comprises one of:
   a Wi-Fi, a BLUETOOTH, Global Positioning System (GPS) positioning, or other Global Navigation Satellite System (GNSS).

* * * * *